(12) United States Patent
Fleishman et al.

(10) Patent No.: US 9,911,219 B2
(45) Date of Patent: Mar. 6, 2018

(54) DETECTION, TRACKING, AND POSE ESTIMATION OF AN ARTICULATED BODY

(71) Applicant: Intel Corporation, Santa Clara, CA (US)

(72) Inventors: Shahar Fleishman, Hod Hasharon (IL); Mark Kliger, Tel Aviv (IL); Alon Lerner, Holon (IL)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 14/749,303

(22) Filed: Jun. 24, 2015

(65) Prior Publication Data

US 2016/0335486 A1 Nov. 17, 2016

Related U.S. Application Data

(60) Provisional application No. 62/161,074, filed on May 13, 2015.

(51) Int. Cl.
*G06K 9/00* (2006.01)
*G06T 13/40* (2011.01)
(Continued)

(52) U.S. Cl.
CPC .............. *G06T 13/40* (2013.01); *G06F 3/017* (2013.01); *G06F 3/0304* (2013.01); *G06F 3/044* (2013.01); *G06K 9/00355* (2013.01); *G06K 9/4604* (2013.01); *G06K 9/6282* (2013.01); *G06T 7/11* (2017.01); *G06T 7/143* (2017.01); *G06T 7/207* (2017.01); *G06T 7/251* (2017.01); *G06T 7/75* (2017.01); *G06T 15/60* (2013.01); *G06T 17/10* (2013.01); *G06T 2200/04* (2013.01);
(Continued)

(58) Field of Classification Search
CPC .............. G06F 3/017; G06F 17/30247; G06T 2207/10028; G06T 2207/10016; G06T 7/246; G06T 7/251; G06K 9/00355; G06K 9/00087; H04N 7/185
See application file for complete search history.

(56) References Cited

U.S. PATENT DOCUMENTS 5,889,528 A 3/1999 Zhao
9,333,649 B1 5/2016 Bradski et al.
(Continued)

FOREIGN PATENT DOCUMENTS

EP 2538305 A2 12/2012

OTHER PUBLICATIONS

Besl, "A Method for Registration of 3-D Shapes", IEEE Transactions on Pattern Analysis and Machine Intelligence, vol. 14, No. 2, Feb. 2, 1992, pp. 239-256 (18 pages).
(Continued)

*Primary Examiner* — Vu Le
*Assistant Examiner* — Guillermo Rivera-Martinez
(74) *Attorney, Agent, or Firm* — Green, Howard & Mughal, LLP

(57) ABSTRACT

Techniques related to pose estimation for an articulated body are discussed. Such techniques may include extracting, segmenting, classifying, and labeling blobs, generating initial kinematic parameters that provide spatial relationships of elements of a kinematic model representing an articulated body, and refining the kinematic parameters to provide a pose estimation for the articulated body.

25 Claims, 12 Drawing Sheets

(51) Int. Cl.

| | |
|---|---|
| *G06F 3/044* | (2006.01) |
| *G06T 15/60* | (2006.01) |
| *G06T 17/10* | (2006.01) |
| *G06T 7/73* | (2017.01) |
| *G06T 7/11* | (2017.01) |
| *G06T 7/143* | (2017.01) |
| *G06T 7/246* | (2017.01) |
| *G06T 7/207* | (2017.01) |
| *G06K 9/46* | (2006.01) |
| *G06K 9/62* | (2006.01) |
| *G06F 3/01* | (2006.01) |
| *G06F 3/03* | (2006.01) |

(52) U.S. Cl.
 CPC ............ *G06T 2200/08* (2013.01); *G06T 2207/10004* (2013.01); *G06T 2207/10024* (2013.01); *G06T 2207/10028* (2013.01); *G06T 2207/30241* (2013.01); *G06T 2213/08* (2013.01); *G06T 2215/12* (2013.01); *G06T 2219/2016* (2013.01)

(56) References Cited

U.S. PATENT DOCUMENTS

| | | |
|---|---|---|
| 2007/0200854 A1 | 8/2007 | Gordon et al. |
| 2011/0069888 A1 | 3/2011 | Lim et al. |
| 2011/0110560 A1* | 5/2011 | Adhikari ............... G06F 3/017 382/103 |
| 2011/0317871 A1 | 12/2011 | Tossell et al. |
| 2012/0281019 A1* | 11/2012 | Tamstorf .............. G06T 3/0093 345/646 |
| 2013/0114902 A1 | 5/2013 | Sukthankar et al. |
| 2013/0329011 A1* | 12/2013 | Lee ...................... G06T 17/00 348/46 |
| 2014/0232631 A1 | 8/2014 | Fleishman et al. |
| 2015/0077326 A1* | 3/2015 | Kramer ................. G06F 3/0325 345/156 |
| 2015/0117708 A1* | 4/2015 | Guigues ............... G06T 7/0042 382/103 |
| 2015/0138086 A1* | 5/2015 | Underkoffler ......... G06F 3/017 345/158 |
| 2015/0177846 A1 | 6/2015 | Yin et al. |
| 2016/0048727 A1* | 2/2016 | Zhang ................. G06K 9/00389 348/164 |
| 2016/0085310 A1* | 3/2016 | Shotton ................ G06F 3/017 382/103 |
| 2016/0086025 A1* | 3/2016 | Shotton ............... G06K 9/00369 382/103 |
| 2016/0307032 A1* | 10/2016 | Butler ................. G06K 9/00208 |

OTHER PUBLICATIONS

Bray, et al., "3D Hand Tracking by Rapid Stochastic Gradient Descent Using a Skinning Model", 1st European Conference on Visual Media Production, 2004. (CVMP), 2004, 10 pages.
Buss, "Introduction to Inverse Kinematics with Jacobian Transpose, Pseudoinverse and Damped Least Squares methods", http://math.ucsd.edu/~sbuss/ResearchWeb/ikmethods/iksurvey.pdf Oct. 7, 2009, 19 pages.
Buss, et al., "Selectively Damped Least Squares for Inverse Kinematics", In Journal of Graphics Tools, vol. 10, No. 3, Oct. 24, 2004, 13 pages.
De Aguiar, E. et al., "Performance Capture from Sparse Multi-view Video", ACM Transactions on Graphics (TOG)—Proceedings of ACM SIGGRAPH 2008, vol. 27 Issue 3, Article No. 98, Aug. 2008.
Dewaele, et al., "The Alignment Between 3-D Data and Articulated Shapes with Bending Surfaces", A. Leonardis, H. Bischof, and A. Pinz (Eds.): ECCV 2006, Part III, LNCS 3953, pp. 578-591, 2006. copyright Springer-Verlag Berlin Heidelberg 2006.
Erol, Ali et al., "Vision-based hand pose estimation: A review", Computer Vision and Image Understanding, vol. 108, Issues 1-2, Oct.-Nov. 2007.
Gall, J et al., "Motion Capture Using Joint Skeleton Tracking and Surface Estimation", IEEE Conference on Computer Vision and Pattern Recognition, 2009 (CVPR 2009), Jun. 20-25, 2009, Miami, Florida, USA.
Grest, Daniel et al., "Nonlinear Body Pose Estimation from Depth Images", Proceedings from 27th DAGM Symposium, Vienna, Austria, 2005.
Keskin, Cem et al., "Hand Pose Estimation and Hand Shape Classification Using Multi-layered Randomized Decision Forests", Proceedings from the 12th European Conference on Computer Vision (ECCV 2012), Florence, Italy, Oct. 2012.
Li, Hao et al., "Global Correspondence Optimization for Non-Rigid Registration of Depth Scans", Eurographics Symposium on Geometry Processing, vol. 27, No. 5, Blackwell Publishing Ltd. Oxford, UK, 2008.
Oikonomidis, I et al., "Efficient Model-based 3D Tracking of Hand Articulations using Kinect", In Proceedings of British Machine Vision Conference (BMVC), 2011.
Orin, David E. et al., "Efficient Computation of the Jacobian for Robot Manipulators", The International Journal of Robotics Research, vol. 3, No. 4, 1984.
Pellegrini, Stefano et al., "A Generalisation of the ICP Algorithm for Articulated Bodies", British Machine Vision Conference (BMVC), vol. 3, p. 4, 2008.
Qian, Chen et al., "Realtime and Robust Hand Tracking from Depth", Proceedings from the IEEE Conference on Computer Vision and Pattern Recognition (CVPR), 2014.
Rusinkiewicz, Szymon et al., "Efficient Variants of the ICP Algorithm", Proceedings from the Third International Conference on 3-D Digital Imaging and Modeling, 2001.
Schroder, M et al., "Real-Time Hand Tracking using Synergistic Inverse Kinematics", 2014 IEEE International Conference on Robotics & Automation (ICRA), Hong Kong Convention and Exhibition Center, May-Jun. 2014, Hong Kong, China.
Serra, Edgar S., "Kinematic Model of the Hand using Computer Vision", PhD Thesis, Institut de Robotica i Informatica Industrial, May 12, 2011.
Sharp, Toby et al., "Accurate, Robust, and Flexible Real-time Hand Tracking", Proceedings of the 33rd Annual ACM Conference on Human Factors in Computing Systems (CHI'15), New York, NY, USA 2015.
Shotton, Jamie et al., "Real-Time Human Pose Recognition in Parts from a Single Depth Image", Microsoft Research, Jun. 2011, from WWW: http://research.microsoft.com/apps/pubs/?id=145347, 8 pages.
Taylor, Jonathan et al., "User-Specific Hand Modeling from Monocular Depth Sequences", Proceedings of the 2014 IEEE Conference on Computer Vision and Pattern Recognition (CVPR'14), IEEE Computer Society, Washington DC, USA.
Tompson, Jonathan et al., "Real-Time Continuous Pose Recovery of Human Hands Using Convolutional Networks", ACM Transactions on Graphics, vol. 33, No. 5, Article 169, Aug. 2014.
Wang, Robert et al., "Real-Time Hand-Tracking with a Color Glove", ACM Transaction on Graphics (SIGGRAPH 2009), vol. 28, No. 3, Aug. 2009.
Zhao, W. et al., "Combining Marker-based Mocap and RGB-D Camera for Acquiring High-fidelity Hand Motion Data", Eurographics/ACM SIGGRAPH Symposium on Computer Animation, 2012.
Notice of Allowance for U.S. Appl. No. 14/749,295 dated May 10, 2017.
Non-Final Office Action for U.S. Appl. No. 14/749,295, dated Jan. 19, 2017.
Baerlocher, Paolo, "Inverse kinematics techniques for the interactive posture control of articulated figures", Diss. Ecole Polytechnique Federale de Lausanne, 2001; pp. 59-82.
Boddy, et al., "Whole-arm reactive collision avoidance control of kinematically redundant manipulators", Robotics and Automation, 1993 Proceedings., 1993 IEEE International Conference on IEEE, 1993.

(56) References Cited

OTHER PUBLICATIONS

Meredith, M. et al., "Adapting motion capture data using weighted real-time inverse kinematics", Computers in Entertainment (CIE) 3.1, 2005: 5-5.

* cited by examiner 801      802      803

DETECTION, TRACKING, AND POSE ESTIMATION OF AN ARTICULATED BODY

RELATED APPLICATIONS

The present application claims the benefit of U.S. Provisional Application No. 62/161,074 filed May 13, 2015, titled "DETECTION, TRACKING, AND POSE ESTIMATION OF AN ARTICULATED BODY", which is hereby incorporated by reference in its entirety.

BACKGROUND

Consumer electronic devices may include imaging devices that may attain images or series of images. Such images may be used to perform object detection, object recognition, gesture recognition, or the like of objects in the scene represented by the images. For example, objects may be detected, tracked, and recognized for focusing the imaging device in image capture settings, gesture recognition, or the like. Furthermore, in gesture recognition contexts, human gestures typically made via the user's hands or face may provide input to the device for navigating the device, playing games, and so on. Such gesture recognition may allow users to interact with the device naturally and without an intervening mechanical interface such as a keyboard, mouse, or even touch display.

In some contexts, it may be desirable to detect, track, identify, and label a blob as a hand blob or other object and generate parameters or the like for a non-rigid model such that when implementing the parameters, the non-rigid model matches, or attempts to match, the blob. Determining such articulated body parameters (e.g., determining the skeleton of an articulated body) based on data captured by a single camera may be a challenging problem due to viewpoint variability, the complex articulations of the body being modeled (e.g., fingers in the context of hands), the prevalence of self occlusions caused by natural motions, and the like. Earlier techniques in the context of object detection and tracking have focused on input from RGB and grayscale images. However, the introduction of consumer grade 3D sensors has shifted the focus to techniques based on the 3D data obtained by such devices. Current techniques include reconstructing a deformable surface model and matching articulated body models (e.g., hand models or the like) to input depth images by solving an optimization problem.

It may be advantageous to detect, track, and provide a pose estimation of an articulated body based on input image data. It is with respect to these and other considerations that the present improvements have been needed. Such improvements may become critical as the desire to perform object detection, tracking, and pose estimation becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
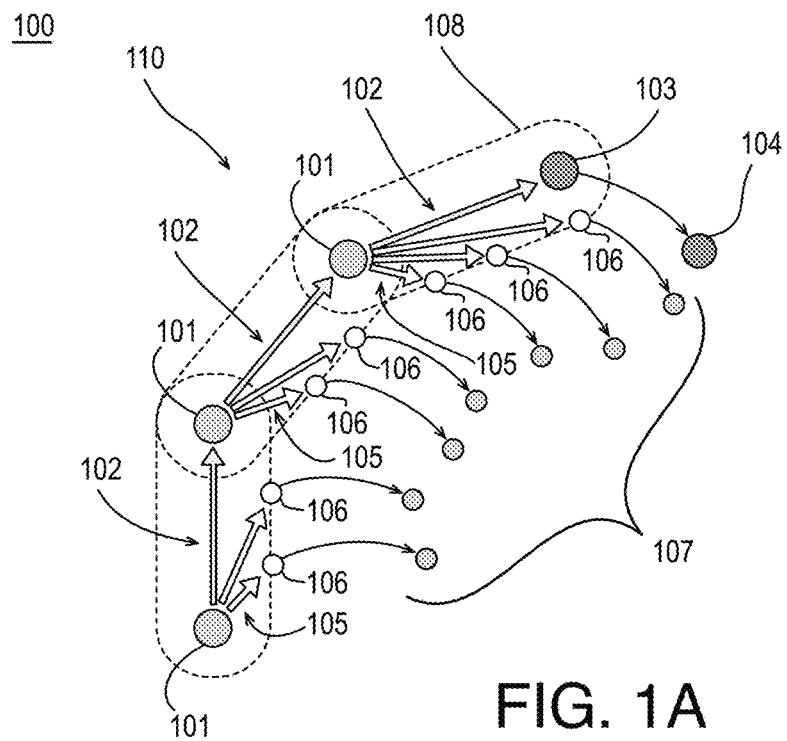
FIG. 1A illustrates an example kinematic model of an articulated body.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to detection, tracking, and pose estimation of an articulated body and, in particular, to generating a pose estimation of an articulated body based on input image data.

As discussed, it may be advantageous to detect, track, and provide a pose estimation of an articulated body based on input image data. Embodiments herein may provide pose estimation for an articulated body by classifying a segmented blob as a hand blob and generating finger labels for the hand blob. Based on the labeled hand blob, initial kinematic model parameters that provide spatial relationships of elements of a kinematic model representing an articulated body may be generated. A kinematic model refinement may be applied to the initial kinematic model parameters based on matching the kinematic model to target positions of the hand blob to generate resultant kinematic model parameters. Such a kinematic model refinement may include any suitable technique or techniques such as a particle swarm optimization technique, a Levenberg Marquardt technique based on a numerical Jacobian, a partial Levenberg Marquardt technique, an inverse kinematics based iterative closest point technique, or the like.

Furthermore, embodiments discussed herein may provide additional sets of initial kinematic model parameters for refinement such that a best refined set of kinematic model parameters may be determined and provided as output kinematic model parameters. Such sets of initial kinematic model parameters may be generated based on a wide array of available data such as permutations of finger labels applied to the hand blob, hand models from previous frames, rigid body transformed hand models from previous frames, or the like. The target for matching the kinematic model may include the detected and tracked hand blob with or without finger labels for example.

As discussed, the kinematic model refinement may include any suitable technique or techniques such as a particle swarm optimization technique, a Levenberg Marquardt technique based on a numerical Jacobian, a partial Levenberg Marquardt technique, an inverse kinematics based iterative closest point technique, or the like. In some embodiments the refinement may include an inverse kinematics based iterative closest point technique. For example, embodiments discussed herein may address the problem of matching a kinematic model of an articulated body to a point cloud or the like obtained from an input image. For example, the input image may be generated via a consumer grade 3D sensor or the like. In some examples, ICPIK techniques (e.g., iterative closest point techniques based on a solution to the inverse kinematic problem) may be used. The discussed techniques may be advantageous due to their accuracy and computational efficiency. For example, such computational efficiency may be achieved by relying on an inverse-kinematics framework for analytical derivation of a Jacobian matrix and, in some examples, the enforcement of kinematic constraints. Such advantages may be demonstrated based on the performance of the ICPIK techniques by integrating them into a real-time hand tracking system. The discussed techniques may achieve similar or improved accuracy while significantly reducing computation time.

For example, advances in 3D imaging technology may allow for 3D capture of objects and people in a scene at high, interactive frame rates. The availability of this technology in a low-cost and small form factor package may increase interest in the area of human-computer interaction, such as the problem of tracking an articulated body such as a hand skeleton, which may enable the design of interactive applications controlled by a user's natural movements.

In some examples, a natural representation for articulated objects which possess an underlying skeletal structure, such as human hands and bodies and the like, may include kinematic chains of rigid bodies (e.g., bones) connected together by joints. The kinematics equations of the body may define the relationship between the joint angles and its pose (e.g., the pose of the articulated object or body). The forward kinematics (FK) problem may use the kinematic equations to determine the pose given the joint angles and bones lengths. The inverse kinematics (IK) problem may determine the joint angles for a desired pose of the articulated body.

The techniques discussed herein may provide an efficient articulated iterative closest point algorithm for matching a kinematic model of an articulated body to a point cloud or the like. Such techniques may include solving an optimization step of an iterative closest point (ICP) technique based on an inverse kinematics solver. For example, the solver may be used to determine analytic derivatives of the IK optimization function, which may allow for efficient estimation of the non-rigid transformation of an articulated body in an ICP based structure. Furthermore, it may enable the enforcement of additional constraints in the ICP formulation, such as kinematic physical constraints, repulsive points that push the model away, weighting parameters, or the like. The techniques discussed herein may be characterized as iterative closest point inverse kinematics (ICPIK) techniques or the like. For example, as discussed herein, an Iterative Closest Point (ICP) technique may find a transformation that aligns two point clouds or the like. At each iteration, the process may update the correspondence between the source and target point clouds, and determine the transformation that best aligns them until convergence is attained.

FIG. 1A illustrates an example kinematic model 100 of an articulated body, arranged in accordance with at least some implementations of the present disclosure. As shown, kinematic model 100 may include joints 101, links 102, end-effectors 103, and model skin 108. In the illustrated example, kinematic model 100 may be in a pose 110. For example, kinematic model parameters may be provided for kinematic model 100 to define pose 110 (e.g., the kinematic model parameters may be implemented via the kinematic model to determine pose 110 via a forward kinematics technique). In the example of FIG. 1A, kinematic model 100 includes a model of a finger. However, kinematic model 100 may include a model of any articulated body such as a hand, a human body, or the like.

Furthermore, kinematic model 100 includes three joints 101 (e.g., associated with anatomical joints of a finger), one end-effector 103 (e.g., associated with a tip of a finger), and three links 102 connecting the joints and the end-effector. However, kinematic model 100 may include any number of joints, links, and end-effectors combined in any suitable manner to represent an articulated body. Furthermore, in some examples, some of joints 101 may also be end-effectors.

As shown, in some examples, kinematic model 100 may include, or an inverse kinematics problem generated based on kinematic model 100 may include, target points 104, virtual links 105, virtual end-effectors 106, and virtual targets 107. Such target points 104, virtual targets 107, virtual links 105, and virtual end-effectors 106 may be generated using any suitable technique or techniques such as those discussed further herein. In FIG. 1A, end-effectors 103 may be assigned to or associated with target points 104. As shown, virtual end-effectors 106 may be added for targets (e.g., virtual targets 107) that are not associated with any specific joint of model 108 by finding the closest point (e.g., virtual end-effectors 106) on model skin 108 to the targets.

As is discussed further herein, providing for a non-rigid transformation for an articulated body may include determining kinematic model parameters for kinematic model 100 that provide the closest match between virtual targets 107 and virtual end-effectors 106 and between end-effectors 103 and targets 104. For example, virtual targets 107 and targets 104 may be determined based on an input image (e.g., a depth map or 3D point cloud or the like) such that they are the targets for matching virtual end-effectors 106 and end-effectors 103. For example, a scene represented by an input image may include a hand having a particular pose. The input image data may represent the hand (e.g., via depth map or a 3D point cloud or the like) and it may be desirable to fit kinematic model 100 to that representation of the hand. Such a fit may be provided by determining the kinematic model parameters that provide a pose that best matches the image data representing the hand.

Furthermore, in some examples, such matching between kinematic model 100 and the representation of the hand may include an iterative approach. For example, pairs of virtual end-effectors 106 and their associated virtual targets 107 may be updated at every iteration (e.g., the pairing between virtual end-effectors 106 and their associated virtual targets 107 may be changed at each iteration) or, at each iteration, new targets (e.g., virtual targets 107) may be selected, new virtual end-effectors 106 may be generated, and a new inverse kinematic problem may be generated. At each iteration, a change in the kinematic model parameters (e.g., a delta in the kinematic model parameters) may be determined based on the inverse kinematic problem. The kinematic model parameters may be updated based on the change and such processing may be repeated until a convergence is met (e.g., an error between kinematic model 100 and the representation of the hand is less than a threshold, the error has plateaued, a maximum number of iterations have been met, or the like). The final kinematic model parameters based on the convergence may be provided as resultant kinematic model parameters. For example, the techniques discussed herein may be iterative and may determine the transformation between the point sets with an IK solver, thus generating a non-rigid transformation of the articulated body.

Figure 2:
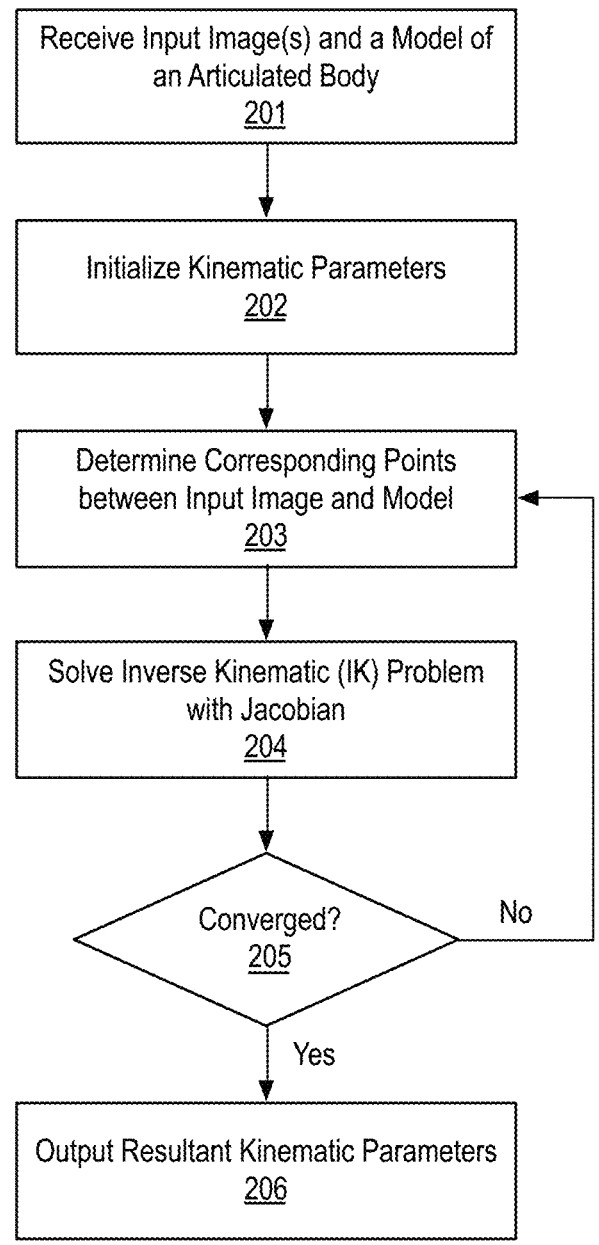
FIG. 2 illustrates an example process for providing a non-rigid transformation of an articulated body.
Figure 3:
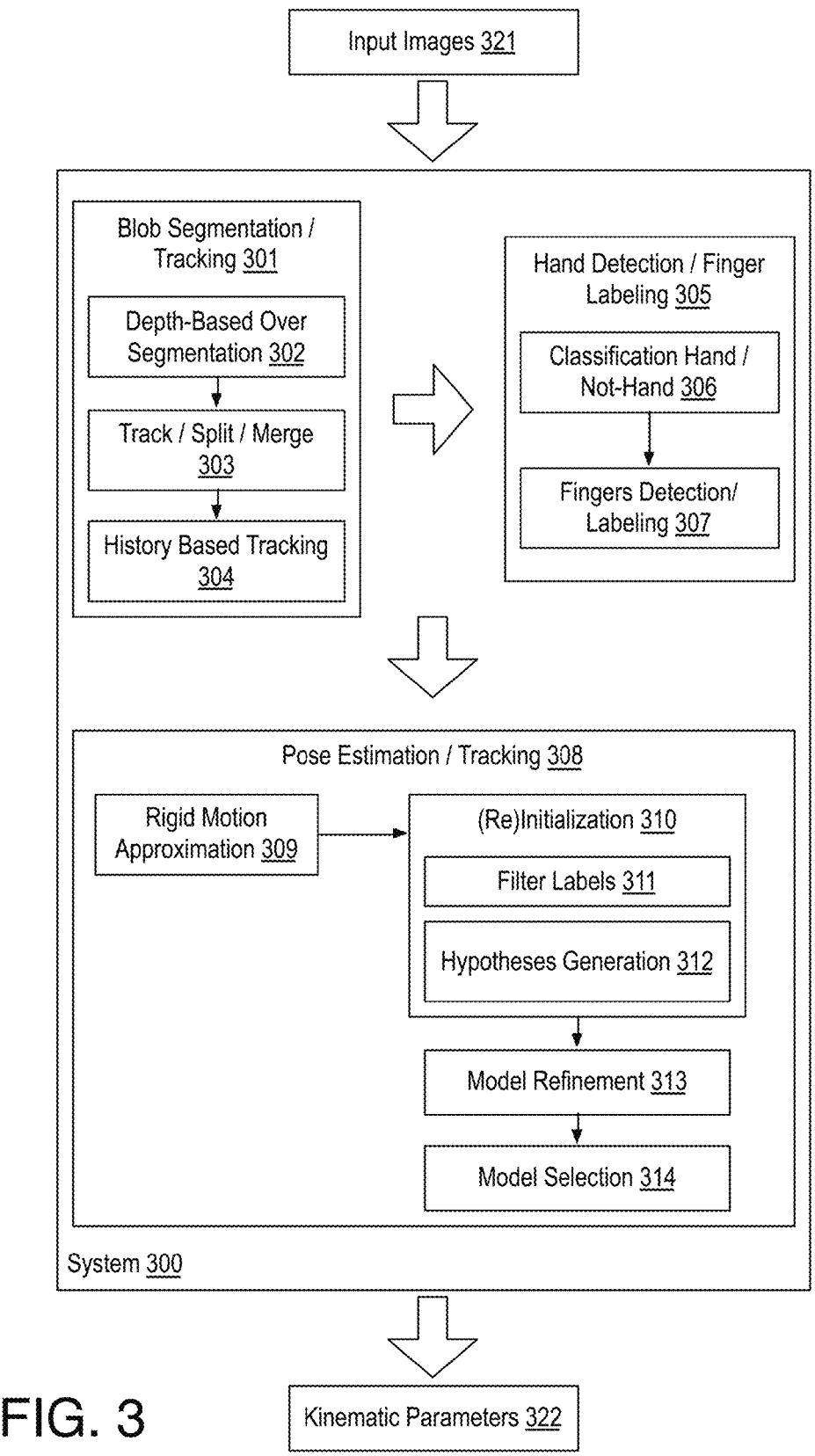
FIG. 3 illustrates an example system for generating a pose estimation for an articulated body.

As is discussed further with respect to FIG. 3, in some examples, a single set of initial kinematic model parameters may be used to determine the final resultant kinematic model parameters such that a refinement of the initial kinematic model parameters may be performed. In other examples, such a refinement may be applied to multiples sets of initial kinematic model parameters such that a best set of refined kinematic model parameters may be used. Furthermore, the refinement may include any suitable technique or techniques such as a particle swarm optimization technique, a Levenberg Marquardt technique based on a numerical Jacobian, a partial Levenberg Marquardt technique, or an inverse kinematics based iterative closest point technique. For example, FIG. 2 illustrates an example, inverse kinematics based iterative closest point (ICPIK) technique.

Figure 1B:
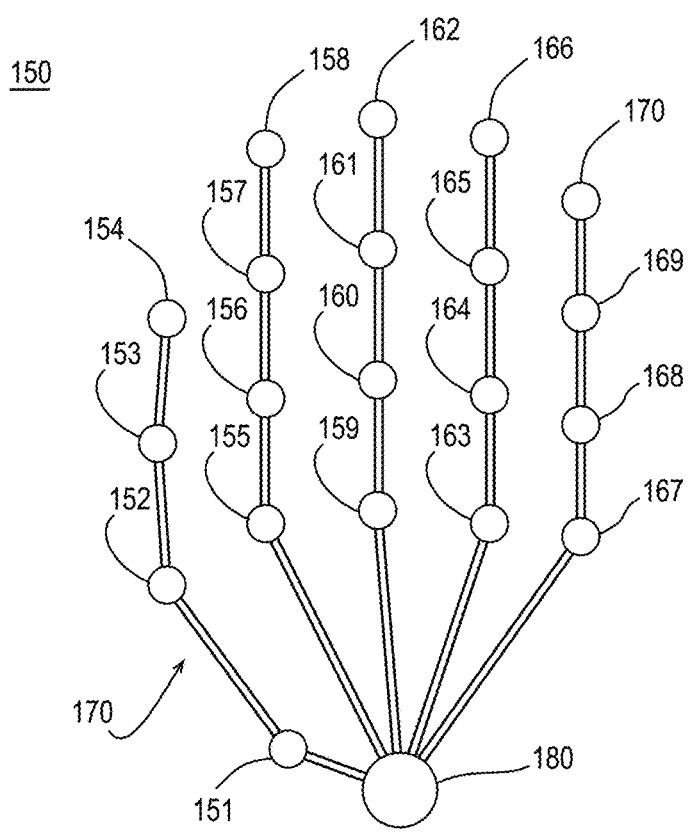
FIG. 1B illustrates an example kinematic model of a hand.

FIG. 1B illustrates an example kinematic model 150 of a hand, arranged in accordance with at least some implementations of the present disclosure. As shown in FIG. 1B, kinematic model 150 may include a base joint 180 (e.g., a chain base or a wrist base or the like), joints 151, 152, 153, 155, 156, 167, 159, 160, 161, 163, 164, 165, 167, 168, and 169 and end-effectors 154, 158, 162, 166, and 170 interconnected by links 170 (e.g., bones). In the example of FIG. 1B and as discussed further herein, base joint 180 may have 6 degrees of freedom including 3 global rotation degrees of freedom and 3 global translation degrees of freedom. Furthermore, finger bases such as joints 151, 155, 159, 163, and 167 may each have 2 degrees of freedom including abduction/adduction and flexion/extension and finger joints such as joints 152, 153, 156, 157, 160, 161, 164, 165, 168, and 169 may each have 1 degree of freedom (e.g., flexion). In such examples, kinematic model 150 may have 26 degrees of freedom.

In the example of FIG. 1B, base joint 180, joints 151-153 and end-effector 154 may provide a kinematic chain providing a thumb. For example, a kinematic change may provide a chain of joints and links that provides or influences a location of an end-effector. Furthermore, base joint 180, joints 155-157 and end-effector 158 may provide a kinematic chain providing an index finger, base joint 180, joints 159-161 and end-effector 162 may provide a kinematic chain providing a middle finger, base joint 180, joints 163-165 and end-effector 166 may provide a kinematic chain providing a ring finger, and base joint 180, joints 167-169 and end-effector 170 may provide a kinematic chain providing a little finger. As discussed with respect to FIG. 1A, virtual end-effectors may be generated on a skin of kinematic model 150 (not shown) and such virtual end-effectors may be associated with joints via virtual links (not shown) and virtual targets such that a pose of kinematic model 150 may be matched to a provided target pose or the like. An example skinned kinematic model is provided in FIG. 4B, which illustrates an example pose 403 of an example kinematic model 404. In the example of FIG. 4B, the kinematic model is skinned with spheres and cylinders; however, other skinning shapes such as meshes or the like may be used. As will be appreciated, kinematic model 404 may take on substantially any shape such as straight fingers, bended fingers, or any combination thereof. Returning to FIG. 1B, similarly, via translation and rotation of the illustrated joints, kinematic model 150 may be provided in any suitable pose.

FIG. 2 illustrates an example process 200 for providing a non-rigid transformation of an articulated body, arranged in accordance with at least some implementations of the present disclosure. Process 200 may include one or more operations 201-206 as illustrated in FIG. 2. Process 200 or portions thereof may be performed by a device or system to provide a non-rigid transformation of an articulated body. Process 200 or portions thereof may be repeated for any number of input images and/or kinematic models, or the like.

Process 200 may begin at operation 201, "Receive Input Image(s) and a Model of an Articulated Body", where an input image, image, image data, or the like and a model of an articulated body may be received. The input image or image data may include any suitable input image data or the like that may represent a scene. For example, the input image or images may include a 3D point cloud, a depth image, and/or a grayscale image or the like. In some examples, a 3D point cloud representing a hand, a human body, or the like may be generated based on depth data and/or grayscale image data as discussed further herein.

Furthermore, the model of the articulated body may include any suitable model such as a kinematic model of any suitable articulated body. Examples herein are discussed with respect to the articulated body being a hand. However, the articulated body may be associated with any suitable non-rigid body such as a human body, an animal body, a machine, or any articulated object that possesses a skeletal structure. For example, the term articulated may include any object having two or more sections connected by a flexible joint. For example, the articulated body may be a laptop with a lid, an office chair with moving hands, back support, and height, and so on. Furthermore, details associated with an example kinematic model of a hand are discussed further with respect to operation 204. As discussed herein, the kinematic model may include multiple joints, multiple end-effectors, and multiple links connecting the joints and/or end-effectors. Furthermore, in some examples, some joints may also be end-effectors. For example, the model received at operation 201 may be a hand model, a human body model, an animal body model, a machine model, or the like.

Processing may continue at operation 202, "Initialize Kinematic Parameters", where kinematic model parameters associated with the kinematic model of the articulated body may be initialized or received or the like. Such kinematic model parameters may be characterized as initial kinematic model parameters, initial parameters, or the like. Such initial kinematic model parameters may provide for an initial pose for the kinematic model that may be refined via operations 203-205. For example, kinematic model parameters may define spatial relationships between the joints, links, and end-effectors (e.g., the elements) of the articulated body model such that the kinematic model has a pose associated with and based on the kinematic model parameters. For example, the kinematic model parameters may include an angle of rotation for a joint (e.g., a rotational joint such that the angle of rotation is about a vector associated with the joint), a translation distance for a joint (e.g., a translational joint such that the translation distance is along a vector associated with the joint), or the like.

The kinematic model parameters may be initialized using any suitable technique or techniques. In some examples, the initial kinematic model parameters may be based on a kinematic model from a previous image or image frame (e.g., process 200 may be performed for an image frame of a video sequence or the like and a previous kinematic model may have been determined for a prior frame of the video sequence). In some example, the initial kinematic model parameters may be based on an estimated pose based on detection and labeling of a hand blob as discussed further herein. In some examples, operations 202-206 may be performed in parallel for multiple initial kinematic parameter sets representing different poses of the kinematic model.

Processing may continue at operation 203, "Determine Corresponding Points between Input Image and Model", where corresponding points between the input image data and the kinematic model may be determined. For example, target positions of virtual target points such as virtual target points 107 (please refer to FIG. 1A) may be selected from the input image or a 3D point cloud based on the input image or the like. In some examples, the target positions of the virtual target points may be selected randomly from such a 3D point cloud or the like. For example, such target positions may be positions to which the kinematic model may be matched. Such matching may be based on finding best match kinematic model parameters as discussed further herein.

Furthermore, at operation 203, virtual end-effectors such as virtual end-effectors 106 may be generated based on the target positions and the kinematic model. In some examples, a virtual end-effector may be generated for each target position such that the virtual end-effectors and the target positions have a one to one correspondence. For example, such virtual end-effectors 106 may be generated at a point closest to an associated virtual target that is on model skin 108. Such a correspondence may therefore be provided between positions or points in a 3D point cloud representing a hand or the like and positions or points of virtual end-effectors of a kinematic model. For example, at operation 203, corresponding points between a 3D point cloud (e.g., target points) and the articulated body model (e.g., virtual end-effector points) may be selected, generated, and a correspondence (e.g., association) may be established.

Processing may continue at operation 204, "Solve Inverse Kinematic (IK) Problem with Jacobian", where an inverse kinematic problem including a Jacobian matrix may be generated based on the initial kinematic model parameters provided via operation 202, the target positions (e.g., from the 3D point cloud or the like) selected at operation 203, and the virtual end-effectors generated at operation 204. The inverse kinematic problem may also include targets 104 and end-effectors 103 as described with respect to FIG. 1A. Such an inverse kinematic problem may include a Jacobian matrix as discussed further herein and may be generated using any suitable technique or techniques.

Furthermore, a change in the kinematic model parameters (e.g., a delta from the initial kinematic model parameters) may be determined based on the inverse kinematic problem (e.g., the problem may be "solved"). As used herein, the term solve or solving with respect to the inverse kinematic problem includes determining a change in kinematic model parameters based on the kinematic problem and is not meant to indicate the error in such kinematic model parameters is zero or optimal or the like. For example, solving the inverse kinematic problem may attempt to minimize the error between the kinematic model and the point cloud or the like but such a solution may leave remaining error and/or find local minimums or the like. The inverse kinematic problem may be generated and solved using any suitable technique or techniques. For example, the inverse kinematic problem may be solved once or iteratively.

As discussed, the model of an articulated body received via operation 201 may include any suitable kinematic model or the like. For example, any articulated body (e.g., a hand, a human body, an animal body, a machine, a device, a laptop with a lid, an office chair, a closet, a robot, or the like) may be represented as a multi-body kinematic system consisting of a set of rigid objects called links (bones) connected together by joints. Joints may have any number of degrees such as a single degree of freedom, DoF=1, and may be rotational (e.g., revolute) or translational (e.g., prismatic), or the like. For example, the kinematic model parameters discussed herein may include an angle of rotation for a rotational joint, a translation distance for a translational joint, or the like. Other joint types, for example screw joints, may be represented by a combination of two or more of the basic joints connected by zero-length links. For example, a rotational joint may be parameterized by a rotation axis and a scalar angle value and a translational joint may be parameterized by a direction vector and translation distance. In some examples, the global 3D position and orientation of an articulated body may be represented by the kinematic model via a root joint, which may include three translational joints and three rotational joints, DoF=6 (e.g., 6 basic joints connected by zero-length links). An articulated body may thus have n joints, each with having a single degree of freedom, DoF=1, and an associated vector $\theta=(\theta_1, \ldots, \theta_n)$, where $\theta_j$ may be the kinematic parameter of the jth joint and wherein the vector $\theta$ may provide at least a portion of the kinematic model parameters.

As discussed, certain points on the links, typically extremity points of kinematic chains, and/or the joints themselves, may be identified as end-effectors. Furthermore, as discussed with respect to operation 203, virtual end-effectors may be defined based on virtual targets or the like. For example, if there are k end-effectors, their 3D positions may be denoted by $s=(s_1, s_2, \ldots, s_k)^T$. Each end-effector's position $s_i$ may be a function of $\theta$ and may be determined by applying forward kinematic (FK) techniques. The objective of the inverse kinematics (IK) problem as provided via operation 204 may be to find the values of $\theta$ that transform the joints so that the end-effectors reach their target position. The target positions (e.g., targets and virtual targets) for the end-effectors may be given by a vector $t=(t_1, t_2, \ldots t_k)^T$. For example, an inverse kinematics problem may attempt to minimize the distance between target positions and end-effector positions. As discussed with respect to operation 203, the target positions and the end-effector positions may include virtual target positions and virtual end-effector positions as provided via operation 203. Furthermore, determining a change in the kinematic model parameters based on the IK problem may attempt to minimize the IK problem. For example, the IK problem may be stated as:

$$\hat{\theta} = \underset{\theta}{\operatorname{argmin}} \|t - s(\theta)\|^2 \qquad (1)$$

where the IK problem attempts to minimize the difference between the end-effector positions and the target positions.

As discussed herein, such end-effectors and target positions may include virtual end-effectors such as virtual end-effectors 106 and virtual target positions such as virtual targets 107. For example, the virtual targets and virtual end-effectors may be generated as discussed with respect to operation 203 such that the virtual targets may be randomly selected or the like based on input image data and the virtual end-effectors may be generated at positions on a skin of the kinematic model closest to associated target positions.

Therefore, an inverse kinematic problem as described herein may include targets and end-effectors and/or virtual targets and virtual end-effectors.

Such an inverse kinematics problem may be generated using any suitable technique or techniques. In some examples, the inverse kinematics problem may include a Jacobian matrix based on the kinematic model parameters (e.g., initial kinematic model parameters determined at operation 202 at a first iteration) and the target positions and virtual end-effectors generated at operation 203. For example, equation (1) may be solved by using a Jacobian matrix to linearly approximate the function $s(\theta)$. For example, the Jacobian matrix of a vector valued function $s(\theta)$ may be the matrix of all first-order partial derivatives with respect to $\theta_j$:

$$J(\theta) = \left(\frac{\partial s_i}{\partial \theta_j}\right)_{i,j} \qquad (2)$$

where J may be characterized as a Jacobian or a Jacobian matrix or the like.

In some examples, the Jacobian may be determined by manual differentiation. In other examples, the Jacobian matrix of forward kinematics may be determined by symbolic or numerical auto-differentiation. In yet other examples, the Jacobian may be determined based on analytically determining the entries in the Jacobian matrix for an arbitrary kinematic model. For example, a Jacobian matrix may be populated based on the kinematic model and the kinematic model parameters to approximate changes in the positions of the end-effectors (e.g., including virtual end-effectors) based on changes to the kinematic model parameters.

As shown with respect to Equation (2), each entry of the Jacobian matrix may include an approximation of a partial derivatives of changes in end-effector position to changes in kinematic model parameters. In some examples, the Jacobian matrix may be populated with such approximations of partial derivatives. In some examples, as implemented via the IK problem as described herein to minimize an error between end-effector positions and associated target positions, elements of the Jacobian matrix of the IK problem may act to attract an end-effector to its associated target and, similarly, to attract a virtual end-effector to its associated virtual target. As is discussed elsewhere herein, in some examples the Jacobian matrix may also include repulsive target elements, weighted target elements, weighted joint elements, or the like.

For example, for a jth rotational joint with DoF=1, $\theta_j$ (e.g., an associated kinematic model parameter) may be its angle of rotation, $p_j$ (e.g., an associated kinematic model parameter) may be its position, and $v_j$ (e.g., an associated kinematic model parameter) may be the unit vector pointing along its current axis of rotation. The corresponding entry in the Jacobian matrix for the rotational joint j affecting the ith end-effector may be:

$$\frac{\partial s_i}{\partial \theta_j} = v_j \times (s_i - p_j) \qquad (3)$$

where the angles may be measured in radians, and the direction of rotation may be given by the right-hand rule. Intuitively, this equation may provide that an infinitesimal rotation around the axis $v_j$ centered at $p_j$ may move the end-effector $s_i$ by an infinitesimal distance, proportional to distance between $s_i$ and $p_j$, along the direction defined by (3). If the ith end-effector is not affected by the jth joint, then $$\frac{\partial s_i}{\partial \theta_j} = 0.$$

Furthermore, for a jth translational joint with DoF=1, $\theta_j$ (e.g., an associated kinematic model parameter) may be its translation distance along its direction vector $v_j$ (e.g., an associated kinematic model parameter). If the ith end-effector is affected by the jth joint, then the corresponding entry in the Jacobian matrix for the translational joint j affecting the ith end-effector may be:

$$\frac{\partial s_i}{\partial \theta_j} = v_j \quad (4)$$

If the ith end-effector is not affected by the jth joint, then $$\frac{\partial s_i}{\partial \theta_j} = 0.$$

Furthermore, the following may be provided:

$$\theta := \theta_0 + \Delta\theta \quad (5)$$

such that resultant kinematic parameters for a current iteration may be the previous kinematic parameters adjusted by the change in kinematic parameters determined as discussed herein. At an initial iteration the previous kinematic model parameters may be the initial kinematic parameters determined at operation 202. Furthermore, in such examples, the end-effector positions may be linearly approximated by:

$$s(\theta) \approx s(\theta_0) + J(\theta_0)\Delta\theta \quad (6)$$

where $\Delta\theta$ may provide the change in kinematic model parameters.

In the following discussion, for the sake of simplicity the parameter vector $\theta_0$ is omitted and the Jacobian matrix is denoted as J. Using the linear approximation (6), (1) may be solved by updating $\theta$ from the previous iteration by $\Delta\theta$ as obtained from:

$$\operatorname*{argmin}_{\Delta\theta} \|e - J\Delta\theta\|^2 \quad (7)$$

where e may be an error vector defined as $e := t - s(\theta_0)$. For example, the change in kinematic parameters may be determined as shown via Equation (7) based on the defined IK problem.

Any suitable technique or techniques may be used to solve a least-squares problem such as (7) including Singular Value Decomposition (SVD), the Jacobian transpose method, pseudoinverse techniques, or the like. In some examples, a Damped Least Squares (e.g., a Levenberg-Marquardt optimization) may be used. A Damped Least Squares approach may offer the advantages of being numerically stable and fast. For example, rather than solving (7), a value of $\Delta\theta$ may be determined that minimizes the $l_2$ regularized version of (7):

$$\|e - J\Delta\theta\|^2 + \lambda\|\Delta\theta\|^2 \quad (8)$$

where $\lambda > 0$ may be the damping constant. Furthermore, minimizing (8) with respect to $\Delta\theta$ may be equivalent to solving:

$$J^T e = (J^T J + \lambda I)\Delta\theta \quad (9)$$

where J, $J^T e$ and/or $J^T J$ may be characterized as a Jacobian or a Jacobian matrix as discussed herein.

For example, solving the kinematic problem as discussed with respect to operation 204 may include solving for a change in the kinematic model parameters (e.g., $\Delta\theta$) based on Jacobian matrix J as shown in Equation (9). The matrix on the right-hand side (RHS) of (9) may be positive definite and may be solved efficiently using Cholesky factorization with Gaussian elimination or the like. Furthermore, the number of equations in (9) is equal to the number of parameters n and is independent of the number of end-effectors m. Also, the matrix $J^T J$ and the vector $J^T e$ may be determined directly from (2) as follows:

$$(J^T J)_{jk} = \sum_{i=0}^{m} \frac{\partial s_i}{\partial \theta_j} \cdot \frac{\partial s_i}{\partial \theta_k} \quad (10)$$

and $$(J^T e)_j = \sum_{i=0}^{m} \frac{\partial s_i}{\partial \theta_j} \cdot (t_i - s_i) \quad (11)$$

For example, (3) and (4) may be substituted into (10) and (11) to provide:

$$(J^T J)_{jk} = \sum_{i=0}^{m} \begin{cases} 0, & j \text{ or } k \text{ are not connected to effector } i \\ (v_j \times (s_i - p_j)) \cdot (v_k \times (s_i - p_k)), & j, k \text{ rot.} \\ (v_j \times (s_i - p_j)) \cdot v_k, & j \text{ rot., } k \text{ trans.} \\ v_j \times v_k, & j \text{ trans.} \end{cases} \quad (12)$$

and $$(J^T e)_{jk} = \sum_{i=0}^{m} \begin{cases} 0, & j \text{ is not connected to effector } i \\ (v_j \times (s_i - p_j)) \cdot (t_i - s_i), & j \text{ rot.} \\ v_j \times (t_i - s_i), & j \text{ trans.} \end{cases} \quad (13)$$

For example, Equations (9), (12), and (13) may provide for an inverse kinematic problem including a Jacobian matrix. Furthermore, from (12) and (13) it is noted that adding pairs of end-effectors and targets to the IK problem does not significantly increase the amount of computation. For example, the pair of end-effector s and target t only affects those entries of the Jacobian matrix $(J^T J)_{jk}$ where both the joints j and k as well as the end-effector $s_i$ belong to the same kinematic chain. Similarly, $s_i$ and $t_i$ only affect the entries of $(J^T e)_j$ in which both the joint j and end-effector $s_i$ belong to the same kinematic chain.

As shown, generating and/or solving the inverse kinematic problem may include populating a Jacobian matrix. As used herein, the term Jacobian matrix may include a Jacobian matrix as provided with respect to Equation (2), which may be populated as shown with respect to Equations (3) and/or (4) and/or a matrix, vector, or value based on such a Jacobian matrix such as $(J^T J)_{jk}$ or $(J^T e)_j$ or the like as shown with respect to equations (9) and (1), which may be populated as shown with respect to Equations (12) and/or (13).

Furthermore, as discussed, such Jacobian matrices may be populated based on kinematic model parameters such as positions of joints, positions of end-effectors, a vector of an axis of rotation for a joint, angles of rotation for joints, translation distances of joints, and the like. Such entries in the Jacobian matrix may provide approximations of partial derivatives of changes in end-effector positions to changes in kinematic model parameters. Typically, as implemented via the discussed inverse kinematics problem, such entries may be effected to minimize the distance between end-effectors and targets such that they may be considered pull or attraction entries or the like. As shown, in some examples, such entries may not be weighted or restricted or the like.

In other examples, weights such as joint weights, target weights, or the like may also be applied. For example, in the absence of such described weights, elements of the Jacobian matrix may have implicit weights having a value of 1. In other examples, the Jacobian matrix may include elements having target weighting parameters associated with particular target positions (please refer to Equations (14)), joint weighting parameters associated with particular joints (please refer to Equations (14) and (15)), or the like. Furthermore, in some examples, the Jacobian matrix may include a repulsive target functionality associated with a particular target position. Such repulsive target functionality may push end-effectors away from each other or targets or the like.

As discussed, in some examples, joint weights may be applied. Applying joint weights may allows certain joints to move or rotate more easily than others. For example, joint weights $w_j > 0$ can be set to be proportional to the cost of changing the joint's parameter $\theta_j$. In such examples, a higher weight may mean the cost to change $\theta_j$ is higher relative to joints with low weights. For example, the following re-parameterization may be provided: $\tilde{\theta}_j = w_j \theta_j$, and (9) may be solved for $\Delta \tilde{\theta}$. Furthermore, target weights $v_i > 0$ may adjust the relative importance of targets $t_i$ by multiplying the error vector $e_i$ by the weight. For example, the joint weights and target weights do not affect the RHS of (9), and (10) and (11) may be reformulated as:

$$(\tilde{J}^T \tilde{J})_{jk} = \sum_{i=0}^{m} \frac{1}{w_j w_k} \frac{\partial s_i}{\partial \theta_j} \cdot \frac{\partial s_i}{\partial \theta_k} \quad (14)$$

and $$(\tilde{J}^T e)_j = \sum_{i=0}^{m} \frac{v_i}{w_j} \frac{\partial s_i}{\partial \theta_j} \cdot (t_i - s_i) \quad (15)$$

where $w_j$ may be a joint weighting parameter associated with a joint j, $w_k$ may be a joint weighting parameter associated with a joint k, and $v_i$ may be a target weighting parameter associated with a target i. For example, as shown, the inverse kinematics problem may include a Jacobian matrix having one or more elements with target weighting parameters associated with targets of the inverse kinematics problem and/or a Jacobian matrix having one or more elements with joint weighting parameters associated with joints of the inverse kinematics problem. For example, after determining $\Delta\tilde{\theta}$, $\theta$ may be updated by $\Delta\theta_i = \Delta\tilde{\theta}/w_i$.

Furthermore, as discussed, the targets implemented as shown with respect to Equations (12) and (13) may be standard pulling targets. In other examples, pushing (e.g., repulsive) targets, point targets, planar targets, joint weights, target weights, or the like may be implemented by modifying or updating the entries of the Jacobian based matrices or vectors such as $J^T J$ and/or $J^T e$. For example, repulsive targets may be defined that push end-effectors away. Repulsive targets may, for example, provide a repulsive target functionality that may prevent self intersections, move the model behind a visible surface, or move it away from regions in space that the body cannot occupy. In other examples, repulsive targets may avoid other implausible configurations such as regions of the model mapping to free-space of the input depth map, hand poses for which fingers occlude into the palm although the palm is visible in the camera's image, or the like. Such repulsive targets may be implemented by adding targets with negative weights which are inversely proportional to the distance from the end-effector, and updating the LHS of (9). For example, a repulsive spherical target $t_i$ with radius r for the ith end-effector $s_i$ may be defined by the weight:

$$v_i = \min\left(\frac{r - \|s_i - t_i\|}{\|s_i - t_i\|}, 0\right) \quad (16)$$

For example, the negativity of the weight may change the direction of the error vector $e_i = t_i - s_i$. For example, for a repulsive target $t_i$ that exists for an end-effector i, such that i is connected to joint j and $\|t_i - s_i\| < r$, the following may be added to the summation RHS of (13):

$$(v_j \times (s_i(\theta) - p_j)) \cdot \frac{s_i - t_i}{\|s_i - t_i\|} (r - \|s_i - t_i\|) \quad (17)$$

if j is a rotational joint, or $$v_j \cdot \frac{s_i - t_i}{\|s_i - t_i\|} (r - \|s_i - t_i\|) \quad (18)$$

if j is a translational joint.

Furthermore, in some examples, joints in a kinematic model may be required to obey restriction constraints. For example, finger abduction/adduction and flexion/extension angles may be restricted by physical limitations. Such restrictions may be provided via a feasibility set applied to a kinematic model parameter. For example, the inverse kinematics problem may include a kinematic model parameter restricted to a feasibility set (e.g., a range of numbers within which the kinematic model parameter must reside) such that the kinematic model parameter must be within the feasibility set.

Such limitations may be expressed in the inverse kinematics problem by reformulating the problem as a bounded constraint optimization problem, in which one or more joints have a lower and upper limit (e.g., $\theta_i \in [l_i, h_i]$), which may be its feasible set. For example, an active set method may be applied for constrained optimization in the following manner: when a constraint is inactive (e.g., the parameter value is within its feasible set), the non-constrained optimization may be applied to it. When a constraint becomes active, $\theta_i$ may be set to its closest limit and in the following iteration, $\theta_i$ may remain constant.

As discussed, to generate an IK problem, certain points on the links may be defined as end-effectors. For example, extremity points of kinematic chains and the joints themselves may be defined as end-effectors. Furthermore, virtual end-effectors as connected to joints via virtual links may be provided. For example, the set of end-effectors, their associated target positions, and the initial value of the kinematic model parameters may define the IK problem. for example, as discussed with respect to operation 203, in some examples, the definition of the IK problem may be generalized by adding additional end-effector-target pairs (e.g., virtual end-effectors 106 and virtual targets 107, please refer to FIG. 1A), not necessarily lying on the links, to the IK problem. For example, the IK problem may provide or work with an articulated body model composed of a skeleton and an associated skin (e.g., model skin 108). In such examples, points on the skin or associated with the skin may be defined as virtual end-effectors 106 as discussed with respect to operation 203. For example, the model skin associated virtual end-effectors may be provided a fixed distance away from any link. Such skin end-effectors may also constitute end-effectors for the purposes of the IK problem as discussed herein.

In some examples, the process of choosing virtual end-effectors and associated virtual targets as discussed with respect to operation 203 may be task dependent. For example, the goal of the techniques described herein may be to estimate the pose of an articulated body to match a depth image or similar data. In such a context, virtual end-effectors and virtual targets may be defined such that random points on the depth image may be chosen as virtual targets and the closest points on the model's skin may be designated as their associated virtual end-effectors. While the virtual end-effectors may not lie on any link, they may be associated with a parent joint. For example, a virtual link such as virtual links 105 (please refer to FIG. 1A) may be assigned between each virtual end-effector and its associated parent joint by the vector originating at the parent joint and terminating at the end-effector, see FIG. 1A. For example, as discussed, pairs of virtual end-effectors and their associated targets may participate in the formulation of the IK problem by increasing the size of the summation in (12) and (13) by the number of virtual targets. For example, adding pairs of virtual end-effectors and their targets does not increase the sizes of the matrix $J^TJ$ and the vector $J^Te$. Therefore, the associated additional computational costs may be small.

Based on the described techniques, the inverse kinematic problem may be used to generate a change in the kinematic model parameters (e.g., a change in initial kinematic model parameters determined at operation 202) at operation 204. For example, the change in kinematic problems may be $\Delta\theta$ as discussed herein. For example, operation 204 may provide a change in the kinematic model parameters determined at operation 202 based on an inverse kinematics problem including a Jacobian matrix based on the initial kinematic model parameters and the target positions and virtual end-effectors determined at operation 203.

As shown in FIG. 2, processing may continue from operation 204 at decision operation 205, "Converged?", where a determination may be made as to whether a convergence has been attained. The convergence may be evaluated using any suitable technique or techniques. For example, convergence may be based on a score such as an error difference between the 3D point cloud and the pose of the kinematic model (e.g., between the virtual target points and the virtual end-effectors; error, e, as discussed herein). For example, convergence may be based on an error between the 3D point cloud and the articulated body model reaching a threshold. As discussed, in some examples, the error may be based on a difference between the positions of the end-effectors and the target positions. In other examples, the convergence may be based on the score reaching a plateau for a predetermined number of iterations (e.g., the change in the score per iteration being less than a threshold or the like), a maximum number of iterations being reached or the like.

If convergence is not met, processing may continue at operations 203-205, as discussed, such that the selection of virtual targets, generation of virtual end-effectors, generation of an IK problem with a Jacobian, determination of a change in the kinematic model parameters, and testing for convergence may be repeated until convergence is met. For example, at each iteration, new virtual targets such as virtual targets 107 from the 3D point cloud or the like may be selected (e.g., randomly or the like), new virtual end-effectors such as virtual end-effectors 106 may be generated (e.g., new correspondences may be established), a new inverse kinematics problem may be generated (e.g. based on the newly selected virtual targets and the newly generated virtual end-effectors), and a new change in the kinematic model parameters may be determined until a convergence is attained.

When convergence is attained, processing may continue at operation 206, "Output Resultant Kinematic Parameters", where the resultant kinematic model parameters may be provided. For example, the resultant kinematic model parameters may provide an improved pose for the kinematic model as discussed herein. In some examples, a transformation may also be provided at operation 206 such that positions of joints and end-effectors may be provided at operation 206.

As discussed, pairs of virtual end-effectors and targets may be updated at every iteration through operations 203 and 204 as discussed herein. For example, the Jacobian based inverse kinematic solver or the like may determine a non-rigid transformation for multi-body objects represented by the kinematic model.

In some examples, the techniques discussed herein with respect to process 200 may be implemented via the following pseudo-code, where M may be the kinematic model, p may be the joints positions, and v may be their axes:

---
Pseudo-Code (A):
---

(M, p, v) = ForwardKinematics($\theta_0$);
for i = 1 to L
    t = SampleTargets(D) ;
    s = FindCorrespondence(t,M);
    Determine $J^TJ$, $J^Te$;
    Find $\Delta\theta$ from (8);
    $\theta_i = \theta_{i-1} + \Delta\theta$;□(M, p, v) = ForwardKinematics($\theta_i$);
end

---

As discussed, the techniques of process 200 may provide a non-rigid transformation of an articulated body. For example, the techniques may include repeating: selecting target positions based on input image data (e.g., target positions from a 3D point cloud representing a target hand or the like), generating associated virtual end-effectors, generating an inverse kinematics problem including a Jacobian matrix, and determining a change in the kinematic model parameters until a convergence is attained. For example, the techniques discussed herein may be integrated it into a real-time hand tracking system. Also as discussed, such techniques may be characterized as an inverse kinematics based iterative closest point technique, an ICPIK technique, or the like. Such kinematic model refinement techniques or other kinematic model refinement techniques may be provided as part of an object detection, tracking, and pose estimation system.

FIG. 3 illustrates an example system 300 for generating a pose estimation for an articulated body, arranged in accordance with at least some implementations of the present disclosure. For example, system 300 may provide for detection, tracking, and/or pose estimation of an articulated body. As discussed herein, the articulated body may be a human body, a human hand, an animal body, a machine, or any other suitable object.

As shown, system 300 may include a blob segmentation and tracking module 301, a hand detection and finger labeling module 305, and a pose estimation and tracking module 308. Also as shown, blob segmentation and tracking module 301 may include a depth-based over segmentation module 302, a track, split, and merge module 303, and a history based tracking module 304. Furthermore, hand detection and finger labeling module 305 may include a hand classification module (classification hand/not-hand module) 306 and a fingers detection and labeling module 307. Also, pose estimation and tracking module 308 may include a rigid motion approximation module 309, a (re) initialization module 308 that may include a filter labels module 311 and a hypotheses generation module 312, a model refinement module 313, and a model selection module 314.

Model refinement module 313 may receive multiple sets of initial kinematic model parameters and may provide resultant kinematic model parameters that provide an improved pose for the associated kinematic model parameter based on a target such as a blob provided via blob segmentation and tracking module 301. For example, model refinement module 313 may implement techniques for providing a non-rigid transformation for an articulated body. Model refinement module 313 may provide such a refinement using any suitable technique or techniques such as a particle swarm optimization technique, a Levenberg Marquardt technique based on a numerical Jacobian, a partial Levenberg Marquardt technique, or an inverse kinematics based iterative closest point technique. In some examples, model refinement module 313 may provide such a refinement via inverse kinematics based iterative closest point (ICPIK) techniques described herein such as those discussed with respect to process 200.

System 300 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform. In some examples, system 300 may receive input images in real-time and system 300 may generate a pose estimation for an object within the field of view of the device. Such a pose may be used for any suitable purposes such as gesture recognition or the like.

As shown, system 300 may receive input images 321. Input images 321 may include any suitable input image, images or image data. For example, input images 321 may include a depth image or images (e.g., 3D depth images) and associated grayscale, RGB, or IR image or the like. Input images 321 may be received from a camera or camera module for example. In some examples, input images 321 may be image frames of a sequence of image frames. In some examples, input images 321 may include data representing a scene being viewed by a device implementing system 300. In some examples, input images 321 may be received from a camera module, an image preprocessor, or the like.

Figure 4A:
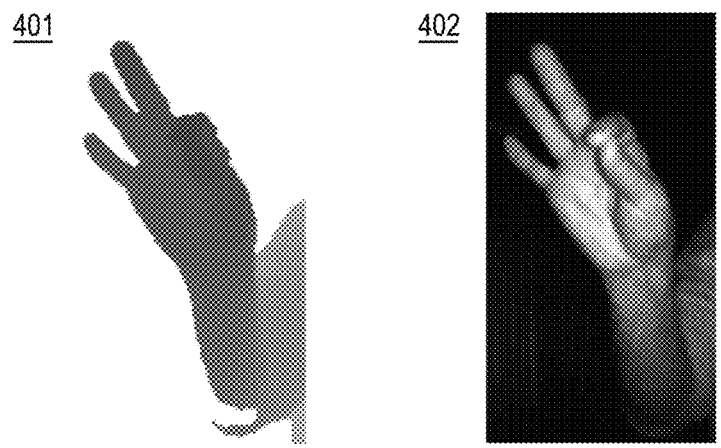
FIG. 4A illustrates example input images.
Figure 4B:
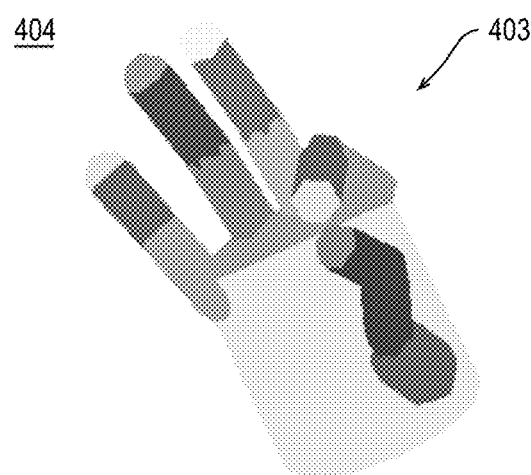
FIG. 4B illustrates an example pose of an example kinematic model.

FIG. 4A illustrates example input images, arranged in accordance with at least some implementations of the present disclosure. As shown in FIG. 4A, in some examples, input images 321 may include a depth image 401 and a grayscale image 402. However, input images 321 may include any suitable image data such as depth image data, grayscale image data, RGB image data, YUV image data, 3D point cloud data, or the like, or any combination thereof. In some examples, depth image 401 may be used to match a hand model and grayscale image 402 may be used to detect and label fingers, as discussed further herein.

Returning to FIG. 3, system 300 may generate and provide kinematic parameters 322 as discussed herein. Kinematic parameters 322 may be resultant kinematic parameters associated with a kinematic model of an articulated body or the like. For example, kinematic parameters 322 may provide a skeleton model of an articulated body. In some examples, kinematic parameters 322 may provide for a pose of an articulated body having a position and orientation in 3D that best fits an object represented by input images 321. For example, input images 321 may include a representation of a hand as shown in FIG. 4A. Such a hand may be identified, tracked, recognized, and the like based on the techniques discussed herein and a kinematic model may be matched to the hand in a pose based on kinematic parameters 322. (e.g., provided kinematic parameters 322, the kinematic model may assume a pose). In some examples, kinematic parameters 322 may represent a single object and, in other examples, kinematic parameters 322 may provide sets of kinematic parameters that represent multiple objects.

FIG. 4B illustrates an example pose 403 of an example kinematic model 404, arranged in accordance with at least some implementations of the present disclosure. As shown in FIG. 4B, kinematic model 404 may be in pose 403. Furthermore, pose 403 may be based on the kinematic model parameters implemented via kinematic model 404 of an articulated body (e.g., a fully articulated hand model or the like). With respect to depth image 401 and grayscale image 402 (e.g., input images) of FIG. 4A, pose 403 of kinematic model 404 closely matches depth image 401 and grayscale image 402 (e.g., input images). For example, system 300 may provide, or attempt to provide, a fully articulated hand model having a position and orientation in 3D space that best fits the input data of input images 321.

Returning to FIG. 3, as discussed, resultant kinematic model parameters for a kinematic model of a hand skeleton or similar articulated body may be generated or provided. For example, a kinematic model of a hand skeleton may include twenty-six degrees of freedom (e.g., six for the root node and four for each finger) as discussed with respect to FIG. 1B and elsewhere herein. Although discussed herein with respect to a hand skeleton, the techniques discussed herein may be applied to any articulated body such as a human body skeleton, an animal body skeleton, a machine, or any object having moving parts. Furthermore, a calibration module of system 300 (not shown) may (at runtime or the like) be provided to adjust the lengths of each bone (e.g., links) according to the proportions of a user's hand. Such a calibration may be performed using any suitable technique or techniques. In some examples, the techniques discussed herein may assume that such bone lengths are constant. Furthermore, kinematic constraints for plausible finger abduction/adduction and flexion/extension angles may be set according to any suitable technique or techniques.

In some examples, system 300 may determine a result of an optimization problem that minimizes the distance between an object or body in input images 321 (e.g., in a depth image of input images 321) and the articulated body model (e.g., of a hand or the like). In some examples, the hand model may include spheres and cylinders that are attached (e.g., skinned) to a skeleton of the model as illustrated with respect to FIG. 4B and discussed elsewhere herein. Although described herein with respect to such spheres and cylinders, the discussed techniques may be applied to other models such as more complex models (e.g., accurate user-specific mesh models or the like). System 300 may determine a result of the optimization problem by finding a good initial guess or guesses for the kinematic model parameters of the kinematics model and then improving on the guess or guesses by applying model refinement techniques (e.g., via model refinement module 313).

For example, blob segmentation and tracking module 301 may provide a hand blob segmentation and/or tracking system. Blob segmentation and tracking module 301 may receive input images 321. Depth-based over segmentation module 302 of blob segmentation and tracking module 301 may extract a blob corresponding to an object (e.g., a hand) in the scene represented by input images 321. Such blob extraction may be performed based on input images 321 using any suitable technique or techniques. In some examples, depth-based over segmentation module 302 may extract a blob based on an over-segmentation of a depth image (e.g., depth image 401 or the like) of input images 321 to generate super-pixels (e.g., via a depth-based over segmentation).

For example, super-pixels may be regions in which the depth derivative is below some predefined threshold such that regions of a depth image may be subdivided by thresholding the depth gradients of the depth image. As discussed, in some examples, depth-based over segmentation module 302 may extract a blob based on depth data. In other examples, depth-based over segmentation module 302 may extract a blob based on RGB image data, IR image data, or the like. In some examples, depth-based over segmentation module 302 may extract a blob based on a combination of two or more of RGB, depth, and IR image data. For example, depth-based over segmentation module 302 may be characterized as a RGB/Depth/IR based over-segmentation module.

Depth-based over segmentation module 302 may provide the extracted blob to track, split, and merge module 303, which may generate a segmented blob based on the received extracted blob using any suitable technique or techniques. In some examples, depth-based over segmentation module 302 may apply a set of heuristics to merge and/or split the super-pixels into semantically meaningful blobs to generate a segmented blob. Such heuristics, for example, may merge regions that overlap a previous frame's blob, if available, by a predefined amount, merge small adjacent regions that appear to be detached fingers, filter out regions that are likely part of the user's arm, or the like.

In some examples, history based tracking module 304 may track blobs from previous frame(s) and/or match extracted blob(s) for the current frame to such blobs from previous frame(s). For example, such matching may provide track, split, and merge module 303 with previous frame blobs or the like that are suspected of matching a blob from a current frame. Such matching may be performed using any suitable technique or techniques such as matching based on a distance measure between blobs across frames or the like. For example, the blob to blob distance measure may be based on a mean depth comparison, contour matching, or the like. In some examples, a blob matched successfully across frames may be indicated or tagged as the same hand as in the previous frame. Furthermore, a blob that was not matched may be indicated or tagged as a hand that entered the field of view at the current frame. For example, history based tracking module 304 may store the blobs from the current frame for use in subsequent processing.

Blob segmentation and tracking module 301 may provide such segmented blobs to pose estimation and tracking module 308. As discussed, system 300 may provide a matched kinematic model (e.g., via selected kinematic model parameters) of an articulated body to a target. In some examples, the target for matching the kinematic model of the articulated body is the segmented blob determined via blob segmentation and tracking module 301. Generating initial kinematic parameters or multiple sets of initial kinematic parameters for matching such a blob, refining such initial kinematic parameters, and choosing a best match (e.g., resultant kinematic parameters) is discussed further herein with respect to pose estimation and tracking module 308.

Furthermore, blob segmentation and tracking module 301 may provide such segmented blobs to hand detection and finger labeling module 305. As shown, hand detection and finger labeling module 305 may include hand classification module 306 to classify such segmented blobs as hand blobs (e.g., blobs associated with hands) or not and fingers detection and labeling module 307 to detect and label fingers (e.g., generate finger labels) for blobs classified as hands. Hand detection and finger labeling module 305 may classify blobs as hand blobs (or not) and generate finger labels for blobs classified as hand blobs using any suitable technique or techniques.

For example, hand detection and finger labeling module 305 may provide detection and/or labeling based on translation, rotation and scale invariant feature vectors. The invariant features may be very fast to compute. Furthermore, an invariant feature vector may allow reducing the size of the required database used for training, which in turn may be faster to create and acquire. In some embodiments, smaller training database and invariant features lead to compact machine learning classifiers, which are advantageous for real-time systems.

Figure 5:
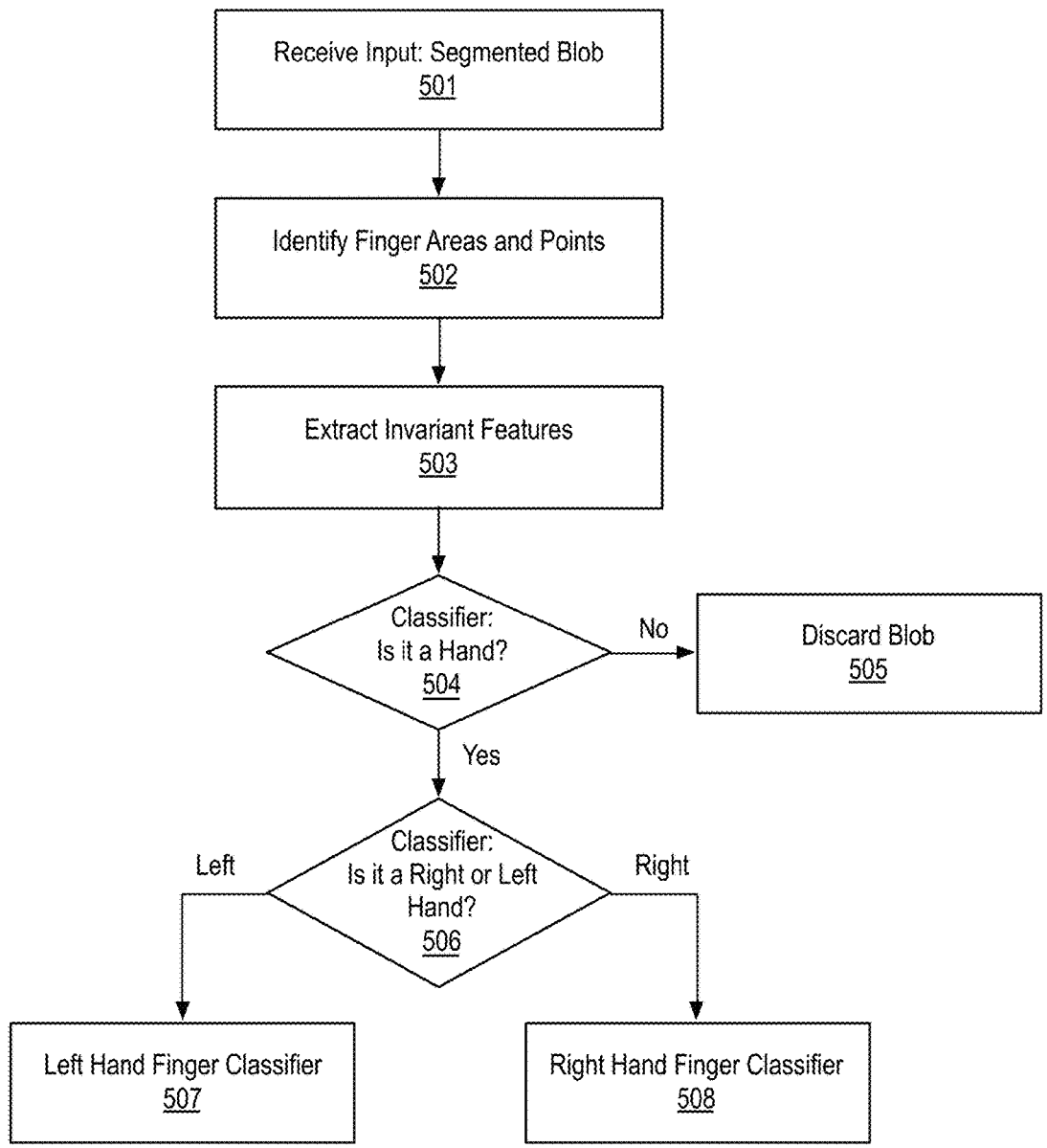
FIG. 5 illustrates an example blob classification and labeling process.

FIG. 5 illustrates an example blob classification and labeling process 500, arranged in accordance with at least some implementations of the present disclosure. Process 500 may include one or more operations 501-508 as illustrated in FIG. 5. Process 500 or portions thereof may be performed by a device or system such as system 300 to provide blob classification and labeling for a segmented blob. Process 500 or portions thereof may be repeated for any number of segmented blobs or the like. Furthermore, in some examples, hand classification module 306 of hand detection and finger labeling module 305 may perform operations 501-505 of process 500 and fingers detection and labeling module 307 of hand detection and finger labeling module 305 may perform operations 506-508 of process 500.

Process 500 may begin at operation 501, "Receive Input: Segmented Blob", where a segmented blob may be received. For example, a segmented blob may be received from blob segmentation and tracking module 301 at hand detection and finger labeling module 305. The segmented blob may be represented by any suitable image data such as pixelated data or the like.

Furthermore, at operation 501, additional image data such as input images 321 or portions thereof may be received.

Processing may continue at operation 502, "Identify Finger Areas and Points", where potential finger areas and points may be identified based on the segmented blob. Such potential finger areas and points may be identified using any suitable technique or techniques. In some examples, an approximated center of the suspected hand's palm (e.g., of the blob) may be located using a point inside the blob that is furthest from a contour of the blob. For example, a distance transform may be used to determine such a point. A radius of the palm may be determined as the distance from the palm center to the contour of the palm. Furthermore, potential fingers may be detected based on the segmented blob as, for example, a locus bounded by two parallel lines of an approximated finger width. For example, edge detection may be applied to the segmented blob to detect portions of the blob expected to be fingers. Such a locus may be determined from an image of the contour of the hand combined with valleys detected based on an IR image, a grayscale image, an RGB image or the like (e.g., as provided via input images 321). Such techniques may detect fingers as well as regions in the image which are not fingers but have similar properties, such as folds parallel to the contour or the like. The detected fingers may then be oriented using the following heuristic: if one end-point of the finger is far from the palm's contour, then that end-point is the tip of the finger; otherwise that end-point is the "base" of the finger. For example, for the portions of the blob suspected to be fingers, bases and/or tips may be located. Such processing may provide suspected finger areas and finger points of the blob, for example.

Processing may continue at operation 503, "Extract Invariant Features", where invariant features may be extracted based on the segmented blob, the identified potential finger areas and/or points, other heuristics, or the like. In some examples, such invariant features (e.g., an invariant feature vector or vectors including such invariant features) may be used to classify the segmented blob and/or label fingers of the blob based on pre-trained classifiers (e.g., matching learning classifiers) implemented via decision operations 504 and 506 and operations 506 and 507, as discussed further herein. For example, analogous invariant features determined for a training set of images may be used to pre-train such classifiers in an offline training and the pre-trained classifiers may be implemented via a memory of system 300 or the like to perform classifications as discussed herein.

Such invariant features may include any suitable features. For example, some invariant features used by such classifiers may be provided as follows. Contours and valleys (e.g., edges) of the image data representing the blob may be transformed such that the base of a finger (e.g., a suspected finger) is placed at the image center and the finger aligns with the image's y-axis. The image may be divided into an N×N rectangular grid having a size proportional to the approximated palm radius (e.g., N may be any suitable value such as 10). For each cell of the grid, the major orientation of the edges within it may be determined and the difference between its average depth and that of the approximated palm center may be determined. For example, histogram of oriented gradients (HOG)-like features may be extracted from such grid cells or patches. Additional features, such as semantic features based on human hand anatomy may be determined (e.g., anatomical semantic feature such as the finger length, finger width, the distance of the finger-base point to the center of the hand, palm radius, etc.). Additional semantic features may include the number of detected fingers in the image, the number of fingers pointing in the same direction as the classified finger, the number of fingers pointing in the opposite direction as the classified finger, the number of fingers that are perpendicular to the classified finger in clockwise order or counter-clockwise order, or the like. Such invariant features may be combined to generate a invariant feature vector or vectors for the segmented blob (e.g., the suspected hand blob). Based on such techniques, the resulting feature values may be rotation, translation, scale and distance invariant. As discussed, the values of all features may be concatenated into a single feature vector or multiple feature vectors may be generated (e.g., one for each portion suspected to be a finger or the like).

Processing may continue at decision operation 504, "Classifier: Is it a Hand?", where a determination may be made as to whether the segmented blob is a hand. Such a determination may be made using any suitable technique or techniques. In some examples, a pre-trained machine learning classifier may be used to determine whether the segmented blob is a hand based on the invariant features extracted at operation 503. For example, a machine learning classifier may be applied to such invariant features (e.g., via one or more invariant feature vectors). The machine learning classifier may be any suitable classifier such as a random forest classifier or the like.

If the blob is determined to not be a hand, the blob may be discarded as shown at operation 505, "Discard Blob".

If the blob is determined to be a hand (e.g., the segmented blob is determined to be a hand blob), processing may continue at decision operation 506, "Classifier: Is it a Right or Left Hand?", where a determination may be made as to whether the hand blob is a left hand blob or a right hand blob based on the invariant features extracted at operation 503. Such a determination may be made using any suitable technique or techniques. In some examples, a pre-trained machine learning classifier may be used to classify the hand blob as representing a left hand or a right hand based on the extracted invariant features (e.g., via one or more invariant feature vectors). The machine learning classifier may be any suitable classifier such as a random forest classifier or the like.

If the blob is classified as a left hand, processing may continue at operation 507, "Left Hand Finger Classifier" and, if the blob is classified as a right hand, processing may continue at operation 508, "Right Hand Finger Classifier", where portions of the hand blob suspected of being fingers may be labeled with one of the five finger names (e.g., pinky, ring, middle, index, or thumb) or numerical indicators (e.g., 1=pinky, 2=ring, and so on) or the like to indicate which finger the portion is most likely to be. Such finger labeling may be performed using any suitable technique or techniques. In some examples, a classifier such as a pre-trained machine learning classifier may be used to provide finger labels to the portions the hand blob. The machine learning classifier may be any suitable classifier such as a random forest classifier or the like.

As discussed, pre-trained machine learning based classifiers may be used to perform the classifications discussed with respect to decision operations 504 and 506 and operations 507 and 508. In some examples, a manually marked set of images with labels may be used to train (e.g., pre-train) the machine learning classifiers. Furthermore, the classifiers implemented via operations 507 and 508 may, as discussed, label fingers with one of the five finger names or marks them as non-fingers. The classifier may provide for each suspected finger (e.g., portion of the blob) a list of probabilities of it being one of the five fingers or a non-finger, for example. In some examples, a portion of the blob with a high non-finger probability may be discarded.

The classifier implemented via decision operation 504 may be pre-trained to determine whether a blob is a hand or not. Such a classifier may be trained on fingers extracted from training images of hands and "false fingers" extracted from blobs which can appear on input images, but are not hands. The classifier implemented via decision operation 506 may be pre-trained to determine whether fingers on a detected hand belong to the left or right hand. Such a classifier may be pre-trained on fingers of the left and fingers of the right hand based on training images. Furthermore, at decision operations 504 and 506, several fingers may be detected and the decision of whether a blob is a hand and/or whether it is a left or right hand may be taken according to a majority vote among all suspected fingers. In some examples, the classification results may be averaged over multiple frames in order to minimize classification errors.

Figure 4C:
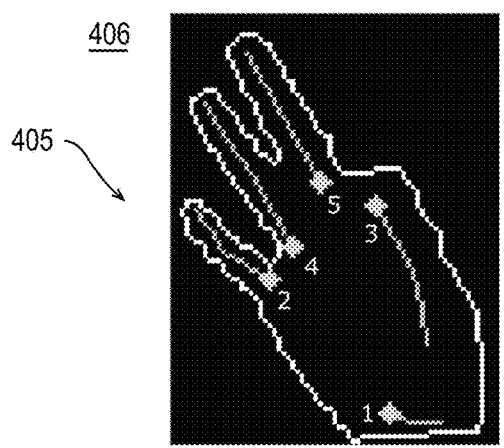
FIG. 4C illustrates example candidate fingers for an example hand blob.

FIG. 4C illustrates example candidate fingers 405 for an example hand blob 406, arranged in accordance with at least some implementations of the present disclosure. As shown in FIG. 4C, in some examples, hand blob 406 may include example candidate fingers 405 (indicated as 1-5 in FIG. 4C). For example, hand blob 406 may have classified as a hand blob at decision operation 504 and hand blob 406 may have been classified as a right hand at decision operation 506. Furthermore, candidate fingers 405 (e.g., portions of hand blob 406 suspected of being fingers) may have been identified as discussed with respect to operation 502 and invariant features (not shown) for such candidate features may have been extracted at operation 504.

Figure 4D:
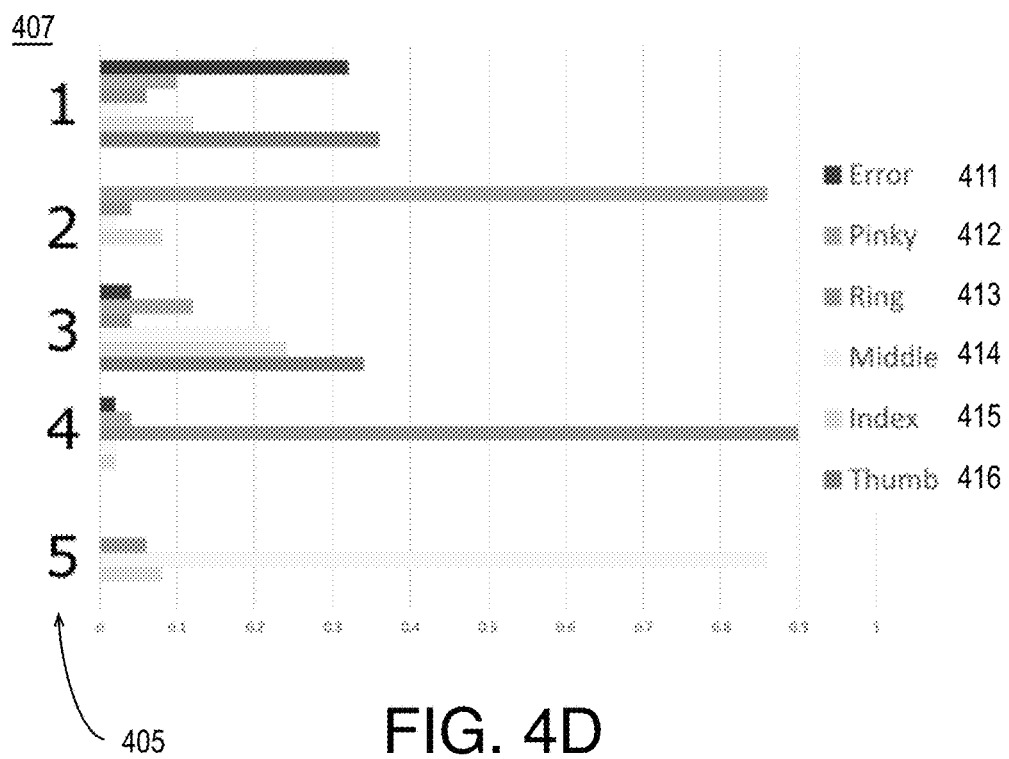
FIG. 4D illustrates example finger label probabilities for candidate fingers.

FIG. 4D illustrates example finger label probabilities 407 for candidate fingers 405, arranged in accordance with at least some implementations of the present disclosure. As shown in FIG. 4D, candidate fingers 405 (labeled as 1-5) may each have associated therewith a probability for each of error 411 (e.g., the suspected finger was suspected to be a finger in error), pinky 412, ring 413, middle 414, index 415, thumb 416. For example, finger label probabilities may be generated by a classifier as discussed with respect to operation 508. As shown, candidate finger 1 has a relatively high probability of being an error or a thumb, candidate finger 2 has a very high probability of being pinky, candidate finger 3 has a mixed probability with a highest probability of being a thumb, candidate finger 4 has a very high probability of being a ring finger, and candidate finger 5 has a very high probability of being a middle finger.

Figure 4E:
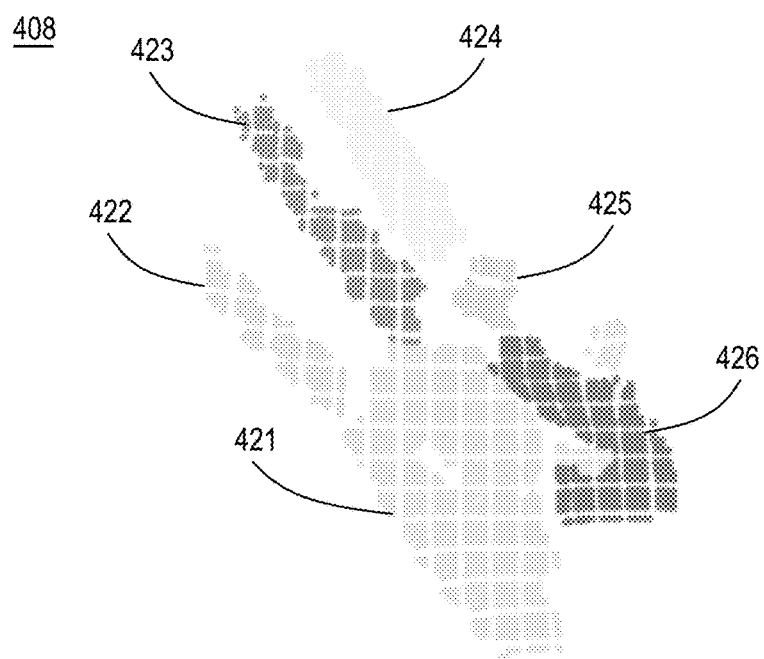
FIG. 4E illustrates example labeled targets for an example subsampled hand blob

FIG. 4E illustrates example labeled targets 421-426 for an example subsampled hand blob 408, arranged in accordance with at least some implementations of the present disclosure. As shown in FIG. 4E, in some examples, a hand blob may be subdivided or subsampled and each subdivision or subsample may be labeled based on finger label probabilities 407 to generate subsampled hand blob 408. As shown, a portion of subsampled hand blob 408 may be divided and labeled to generate palm (e.g., palm of the hand) targets 421, portion of subsampled hand blob 408 may be divided and labeled to generate pinky targets 422, portion of subsampled hand blob 408 may be divided and labeled to generate ring finger targets 423, portion of subsampled hand blob 408 may be divided and labeled to generate middle finger targets 424, portion of subsampled hand blob 408 may be divided and labeled to generate index finger targets 425, and portion of subsampled hand blob 408 may be divided and labeled to generate thumb targets 426.

For example, subsampled hand blob 408 may be used by (re)initialization module 310 to generate an initial guess for initial kinematic parameters for a kinematic model. Such initial kinematic parameters may be based on subsampled hand blob 408 and they may be refined via model refinement module 313. Furthermore, additional initial guesses for initial kinematic parameters may be generated based on subsampled hand blob 408. For example, as discussed with respect to finger label probabilities 407, selected finger labels may be highly probable or they have a lower probability. In some examples, additional initial guesses for initial kinematic parameters may be generated based on swapping finger labels for particular portions of subsampled hand blob 408 and generating initial kinematic parameters based on the modified subsampled hand blob. For example, multiple sets of initial kinematic model parameters may be generated based on finger label permutations (e.g., moving finger labels from best guesses to other guesses) for the hand blob.

Furthermore, as discussed, a hand blob associated with subsampled hand blob 408 (e.g., a non-labeled hand blob) may provide target positions (e.g., target or virtual targets) for matching end-effectors (e.g., end-effectors or virtual end-effectors) of a kinematic model of an articulated body as discussed herein. In particular, with reference to FIG. 1A, a hand blob may provide virtual targets 107 for matching virtual end-effectors 106 as discussed herein. The described sets of initial kinematic model parameters based on the hand blob may be evaluated for error with respect to the hand blob and the best of such sets may be provided for refinement. Each may be refined and the best of the refined kinematic model parameters may be provided as kinematic parameters 322. Such techniques may be advantageous when a hand has first entered the field of view. When a hand has been in the field of view and was previously modeled via kinematic parameters at a previous frame, the previously determined kinematic parameters may under go a rigid motion approximation to generate another set of initial kinematic model parameters for evaluation as discussed further herein. Furthermore, the model associated with the previously determined kinematic parameters may be used to provide finger labels for the blob in addition to (e.g., to provide additional sets of initial kinematic model parameters) or in the alternative to the discussed finger classification techniques.

Returning to FIG. 3, pose estimation and tracking module 308 of system 300 may receive hand blobs (e.g., via blob segmentation and tracking module 301), labeled hand blobs (e.g., via hand detection and finger labeling module 305, and hand poses (e.g., kinematic model parameters or the like) for hand models of previous frames (e.g., via memory or the like). Pose estimation and tracking module 308 may provide kinematic model parameters for a subject hand blob (e.g., of input images 321) by generating one or more sets of initial kinematic parameters (e.g., via (re)initialization module 310), refining each of the sets of initial kinematic parameters to generate resultant sets of kinematic parameters (e.g., via model refinement module 313), and selecting a final set of kinematic parameters (e.g., via model selection module 314) that best matches, or attempts to best match, the hand blob extracted from input images 321.

For example, rigid motion approximation module 309 may estimate or approximate the rigid transformation of a hand model between a previous frame and the current frame. Such a rigid motion approximation may provide an alignment between the previous frame hand model and the current blob. For example, rigid motion approximation module 309 may, based on a kinematic hand model from a previous frame, perform a rigid motion approximation to match or attempt to match the hand blob received via blob segmentation and tracking module 301. In some examples, the kinematic hand model from the previous frame may include finger labels. For example, a rigid transformation may include a transformation of a rigid body (e.g., not including joints and links and the like). Such a rigid motion approximation may be performed using any suitable technique or techniques. For example, the rigid motion of the hand model from the previous to the current frame may be estimated from a set of point pairs determined from depth blobs of the respective frames or the like. In some examples, the rigid motion may be estimated by defining a set of point pairs $(p_i, q_i)$ where $p_i$ is a point on the current blob, and $q_i$ is a point on the previous frame's blob or hand model. In some examples, random sample consensus (RANSAC) techniques may be used to find the best transformation based on triplets of the point pairs or the like.

As shown, the resultant hand model based on the rigid motion approximation may be provided to (re)initialization module 310. (Re)initialization module 310 may use the resultant hand model (e.g., after rigid transformation) to generate initial kinematic model parameters for refinement via model refinement module 313. For example, the initial kinematic model parameters based on the rigid transformation hand model may be one set among several that are evaluated for submission to model refinement module 313. Furthermore, (re)initialization module 310 may use the resultant hand model (e.g., after rigid transformation) to provide finger labels (e.g., via filter labels module 311) to hand blobs (e.g., such finger labels may be copied) received via blob segmentation and tracking module 301 and/or hand detection and finger labeling module 305. For example, the resultant hand model finger labels may be used in place of finger detection and labeling as discussed herein or in addition (e.g., as another permutation of finger labeling). As discussed, such finger labeled hand blobs may be used to generate additional sets of initial kinematic model parameters for evaluation and potential refinement.

For example, in operation, a user may move their hand arbitrarily in 3D space and may not be required to enter the camera's field of view in any particular posture in order to enable tracking. (Re)initialization module 310 may perform both initialization and error recovery from tracking failures or the like. When a hand is detected for the first time, (re)initialization module 310 may provide an initial posture of the skeleton (e.g., kinematic hand model) for example. During tracking, (re)initialization module 310 may provide an intermediate step to improve the initial guess(es) provided by rigid motion approximation module 309 and to provide new hypotheses (e.g., guesses), for example, when tracking is lost. In some examples, to save computational resources, (re)initialization module 310 may not be enabled at every frame. For example, (re)initialization module 310 may be enabled once every K frames.

Furthermore, as discussed, a classifier may be applied, via fingers detection and labeling module 307 to identify regions of the blob (e.g., as provided via blob segmentation and tracking module 301) that are likely candidates to be fingers, which may be used to generate plausible poses of the hand as is discussed further herein. For example, fingers detection and labeling module 307 may provide finger labels to pose estimation and tracking module 308. In some examples, the candidate fingers may not be dependent on the results of previous frame's tracking and therefore they may provide an effective mechanism for error recovery or the like. Furthermore, (re)initialization module 310 may generate a set of skeleton hypotheses (e.g., sets of kinematic model parameters or the like) that may be sets of kinematic model parameters that constitute initial guesses for model refinement module 313.

As discussed, (re)initialization module 310 may generate a set of skeleton hypotheses (e.g., sets of kinematic model parameters or the like). For example, (re)initialization module 310 may generate a set of skeleton hypotheses that are passed as initial guesses to model refinement module 313. In some examples, when a hand is detected for the first time, a set of possible poses for the skeleton may be generated from detected and labeled fingers based on a hand blob (as discussed with respect to fingers detection and labeling module 307). Such poses may also be generated at subsequent detections of the hand. Furthermore, when a blob was detected as a hand from a previous frame, the rigid transformation (e.g., as performed via rigid motion approximation module 309) may generate an additional hypothesis for the pose of the hand. (Re)initialization module 310 may add several more skeleton hypotheses, such that each finger may be assigned to one of the labeled fingers, assumed to be folded, or kept in its post-rigid pose, or the like.

For example, filter labels module 311 may receive a rigid transformation hand model (if available) from rigid motion approximation module 309, a labeled hand blob from hand detection and finger labeling module 305 (if applicable), and finger label probabilities for such a labeled hand blob (e.g., finger label probabilities 407, please refer to FIG. 4D). Filter labels module 311 may filter such finger labels (e.g., eliminate duplicates and/or nonsensical finger labels) and filter labels module 311 may provide permutations of finger labels applied to suspected finger portions to hypotheses generation module 312.

Hypotheses generation module 312 may receive such permutations of finger labels, segmented and/or labeled hand blobs, rigid transformation hand models, and the like, and hypotheses generation module 312 may generate multiple sets of initial kinematic model parameters for a kinematic model. As discussed, such kinematic model parameters may provide spatial relationships of elements of the kinematic model representing an articulated body. Hypotheses generation module 312 may provide the sets of initial kinematic model parameters to model refinement module 313.

In some examples, hypotheses generation module 312 may evaluate the sets of initial kinematic model parameters and provide only a subset of the set to model refinement module 313. For example, each of the sets of initial kinematic model parameters may be scored, indicating how well the kinematic model implementing the initial kinematic model parameters fits the input, (e.g., the blob) and the top K configurations may be provided to model refinement module 313. The score may be generated using any suitable technique or techniques. In some examples, the score may be based on a comparison of errors for the sets of initial kinematic model parameters. For example, each error may be based on a comparison of the kinematic model implementing the initial kinematic model parameters and the blob. In some examples, to minimize the size of the set, the input may be divided into groups of similar skeletons. From each group only a single skeleton may be kept and the rest may be discarded. A score may be assigned to each remaining skeleton and the skeletons with the highest score may be selected. The combination of initialization and tracking discussed with respect to (re)initialization module 310 may improve the reliability of system 300, reduce error accumulation over time, and alleviate the need for an additional error-detection module.

Model refinement module 313 may receive the sets of initial kinematic model parameters and model refinement module 313 may refine each set to generate sets of refined kinematic model parameters. In some examples, model refinement module 313 may be characterized as an optimization module or the like. Model refinement module 313 may provide such a refinement or optimization using any suitable technique or techniques such as particle swarm optimization (PSO), full Levenberg Marquardt (LM) techniques with numerical Jacobian, partial LM techniques, or the like. In some examples, inverse kinematics based iterative closest point (ICPIK) techniques may be implemented as discussed herein. For example, model refinement module 313 may provide the refinement as described with respect to process 200 such that the refinement includes a non-rigid transformation that determines resultant kinematic model parameters that provides a matching of the kinematic model to target positions of the hand blob.

For example, model refinement module 313 may generate an optimization problem in the space of the kinematic model parameters associated with the articulated body (e.g., the hand or the like) such that the goal of the optimization problem may be to determine a skeleton configuration (e.g., kinematic model parameters) of the kinematic model that minimizes the distances between points sampled from the kinematic model and the blob. Model refinement module 313 may generate and solve the optimization problem using any suitable technique or techniques. For example, the optimization problem may determine a correspondence between the input depth image and the hand model (e.g., the kinematic model) as defined by a set of kinematic model parameters. In some examples, a subset of the observed points of the blob, $t_i$, $i\epsilon[1, N]$, may be selected as target points or positions. In some examples, finger labels may be assigned to every sample point based on proximity. For example, points may have labels for one of the fingers, for the palm, or have no label. For each target point $t_i$, a closest point $□s_i$ may be determined that lays on the surface of the hand model (e.g., the skin of the hand model) and on the side facing the camera. In some examples, such points may be characterized as virtual end-effectors or the like.

In some embodiments, a Root Mean Square distance (RMS) between the observed points in the depth image t (e.g., the target points) and corresponding closest points on the skeleton's hand model $s_i$ (e.g., virtual end-effectors or the like) may be used as a score function in model refinement module 313 and (re)initialization module 310. □In other embodiments, different score functions may be used. For example, a score function may include penalties if points from the hand model $s_i$ when projected into image space fall outside the hand blob's contour as determined by blob segmentation and tracking module 301. Furthermore, model refinement module 313 may minimize the score function based on kinematic model parameters using any suitable technique or techniques such as particle swarm optimization (PSO) techniques, Levenberg Marquardt (LM) techniques based on a numerical Jacobian, partial Levenberg Marquardt (LM) techniques, or the like. In some examples, inverse kinematics based iterative closest point (ICPIK) techniques may be implemented as discussed herein. In some examples, model refinement module 313 may implement techniques as discussed with respect to process 200.

In some examples, the matching performed via model refinement module 313 may include selecting target positions based on a hand blob. For example, the target positions may be selected randomly from the hand blob. Multiple virtual end-effectors may be generated corresponding to the target positions and the kinematic model (e.g. the virtual end-effectors may be on a skin of the hand model each at a location closest to an associated target position). An inverse kinematic problem including a Jacobian matrix may be generated based on the initial kinematic model parameters, the target positions, and the virtual end-effectors. A change in the kinematic model parameters may be determined based on the inverse kinematics problem. And, as discussed with respect to operations 203-205 of process 200, such selecting of target positions, generating the virtual end-effectors, generating the inverse kinematics problem, and determining the change in the kinematic model parameters may be repeated until a convergence is attained to generate the resultant kinematic model parameters. Furthermore, any techniques discussed herein may be applied via model refinement module 313 such as target weighting parameters, joint weighting parameters, repulsive target functionality, feasibility sets for kinematic model parameters, or the like.

Furthermore, additional knowledge extant in the skeleton hypotheses regarding which regions of the depth blob correspond to fingers may be leveraged. For example, the skeleton's fingers may be projected onto the depth blob to assign an appropriate finger label to each pixel of the depth blob. For example, the labels may be propagated (e.g., via the watershed transform or the like) to fill the entire blob. In some examples, the pixels may be randomly subsampled so that each label has at most L pixels assigned to it. L may be any suitable value such as L=200 or the like. Weights may be assigned to the selected pixels so that the sum of the weights for each label equals one. FIG. 4E illustrates an example of such labeling. Such pixels may provide virtual targets as discussed herein. Also, as discussed, for each virtual target, a virtual end-effector may be generated and associated to the virtual target by choosing the closest point on the kinematic model with surface normal facing the camera.

As shown, model refinement module 313 may provide the sets of resultant kinematic model parameters to model selection module 314, which may select and output a set of resultant kinematic model parameters. Model selection module 314 may select the resultant kinematic model parameters using any suitable technique or techniques. In some examples, model selection module 314 may select the resultant kinematic model parameters based on a scoring. For example, the scoring may include determining an error for each set of resultant kinematic model parameters. The error may be based on a comparison of the kinematic model implementing the set of resultant kinematic model parameters with the hand blob (e.g., the target), for example. Model selection module 314 may select the set of resultant kinematic model parameters with the lowest score, for example, and output the selection as kinematic parameters 322. For example, a root mean square (RMS) error between the virtual end-effectors and virtual targets may be the error metric used to select the final resultant kinematic model parameters.

Figure 6A:
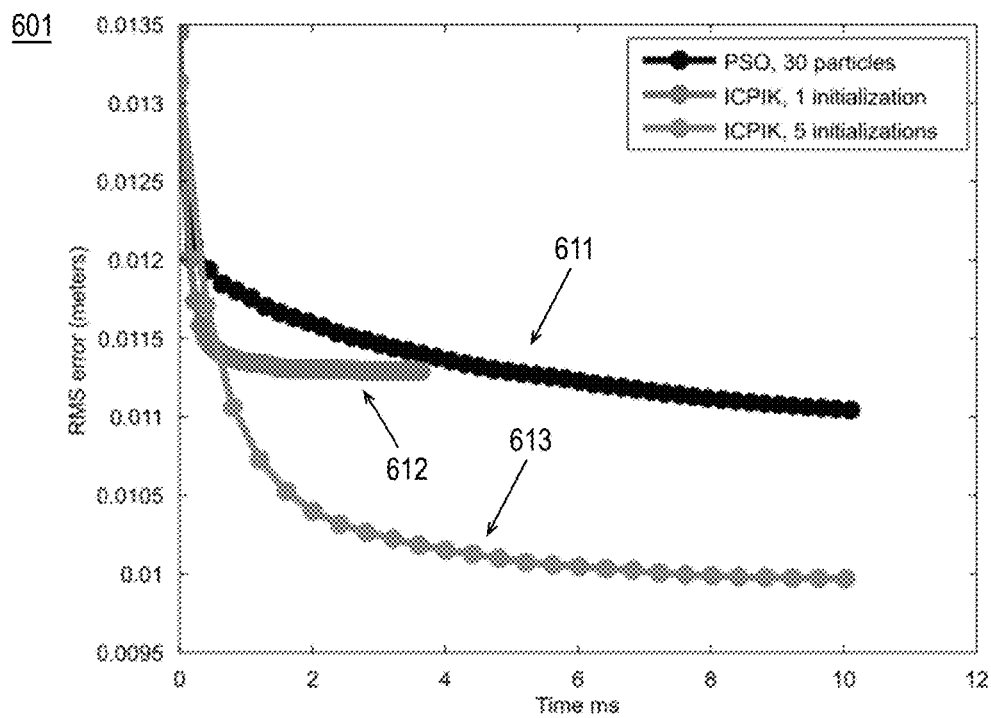
FIGS. 6A and 6B illustrate runtime performance of example refinement techniques.
Figure 6B:
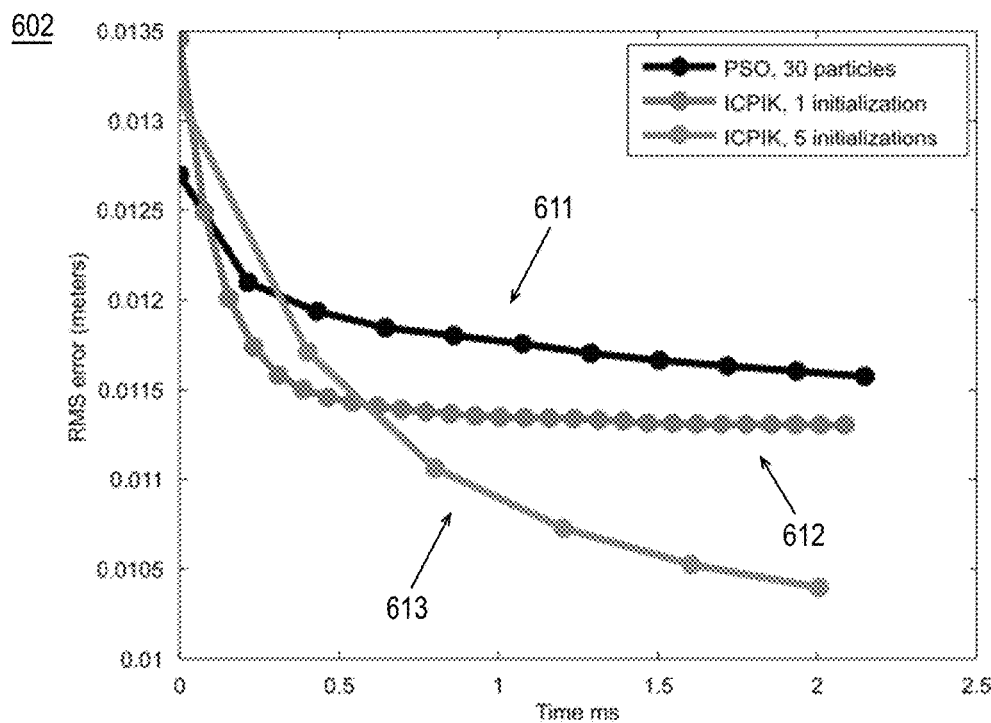
Figure 7:
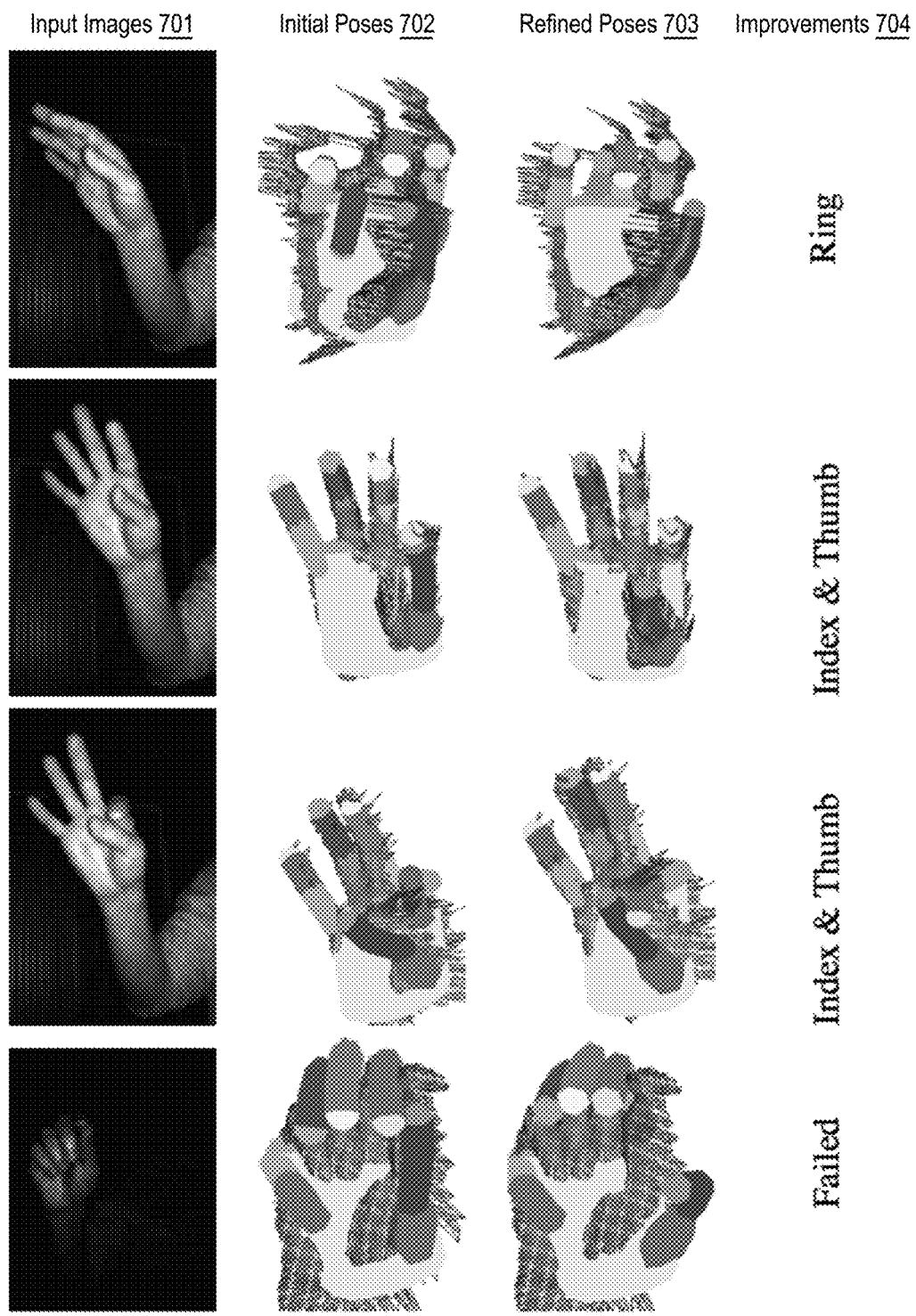
FIG. 7 illustrates example qualitative results of example refinement techniques.
Figure 8:
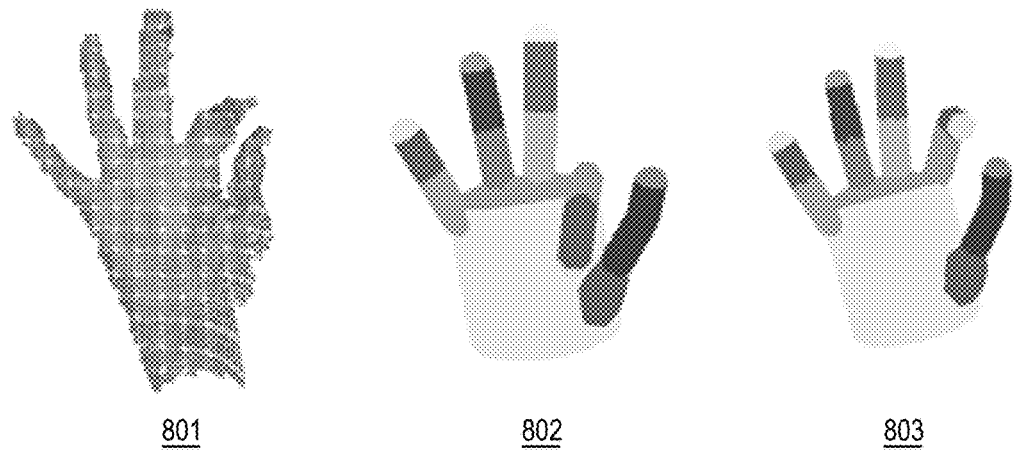
FIG. 8 illustrates an example input hand blob, an example initial pose, and an example resultant pose.

The described techniques may provide detection, tracking, and pose estimation of an articulated body. Such techniques may be computationally efficient and may provide high quality results. As discussed, the refinement provided via model refinement module 313 may include any suitable refinement technique or techniques such as a particle swarm optimization technique, a Levenberg Marquardt technique based on a numerical Jacobian, a partial Levenberg Marquardt technique, an inverse kinematics based iterative closest point technique, or the like. FIGS. 6A, 6B provide example performance results based on inverse kinematics based iterative closest point technique and particle swarm optimization techniques. FIGS. 7 and 8 provide example results based on inverse kinematics based iterative closest point techniques.

FIGS. 6A and 6B illustrate runtime performance of example refinement techniques, arranged in accordance with at least some implementations of the present disclosure. For example, FIGS. 6A and 6B illustrate charts 601, 602 of error as a function of computation time in milliseconds for particle swarm optimization techniques 611, the discussed ICPIK techniques using ICPIK single hypothesis 612, and ICPIK with five hypotheses 613. FIGS. 6A and 6B may be at different time scales for example.

For example, the runtime performance and accuracy of the discussed ICPIK techniques were tested on 3000 consecutive frames from six sequences of different people performing a variety of gestures in front of the camera. A single hypothesis version of the ICPIK techniques (e.g., ICPIK single hypothesis 612) was compared to a particle swarm optimization (PSO) and to a multiple-hypotheses ICPIK (e.g., ICPIK with five hypotheses 613). In each case, the optimization techniques received the same initial state. The accuracy of each technique was measured using an objective error metric (e.g., root mean square (RMS) distance) between sets of corresponding end-effectors and targets. FIGS. 6A and 6B illustrate plots of the error as a function of the computation time in milliseconds for each technique. The initial state with the highest score was used for initialization of the single-hypothesis ICPIK, and top five initial states were used for initialization of the PSO and ICPIK with multiple hypotheses. For the PSO technique, 30 particles (e.g., six for each model) were used, which were generated by randomly perturbing the same five states used to initialize the ICPIK. All techniques were performed on a state of the art laptop.

As shown in FIG. 6B, the ICPIK techniques may converge within about 8 iterations, requiring about 0.8 ms, while the PSO algorithm with 30 particles may require about 4 ms to achieve the same error. The implementation of ICPIK based on five initial hypotheses further minimizes the error, which may indicates that the single hypothesis ICPIK techniques may converge to local minima and may benefit from multiple initializations. In the hand tracking system described herein the number of iterations to 20 may be limited to 20, which may require 2 ms of computation time for a single hypothesis ICPIK. For all twenty iterations, about 55% of the time (1.1 ms) may be spent computing the correspondences between the hand model and the depth image and the rest of the time (0.9 ms) may be spent on computing the Jacobian matrix and the rest of the DLS solution.

FIG. 7 illustrates example qualitative results of example refinement techniques, arranged in accordance with at least some implementations of the present disclosure. For example, FIG. 7 illustrates example results for ICPIK techniques as described herein. As shown in FIG. 7, initial poses 702 associated with input images 701 may be generated using any techniques discussed herein. Furthermore, refined poses 703 may be generated based on initial poses 702 using the refinement techniques discussed herein such as ICPIK techniques or the like. FIG. 7 also provides improvements 704 associated with the transformation between initial poses 702 and refined poses 703. In FIG. 7, poses 702, 703 may be rotated to provide better views.

As shown, the first three rows (progressing from the top-down) illustrate sample transformations in which the discussed techniques improved the initial hypothesis and the fourth row shows a failure case. For example, the first row shows an improvement in the ring finger between the initial pose and the refined pose, the second row shows an improvement in the index finger and the thumb between the initial pose and the refined pose, and the third row shows an improvement in the index finger and the thumb between the initial pose and the refined pose. For example, given an adequate initial pose, the described techniques may prevents the pose tracking from drifting. The fourth row shows a failed case where the discussed techniques failed to improve on the initial pose. Such failures may be due fast motions, noisy or imperfect depth image, or other sources of error.

FIG. 8 illustrates an example input hand blob 801, an example initial pose 802, and an example resultant pose 803, arranged in accordance with at least some implementations of the present disclosure. For example, hand blob 801 may be represented as a 3D mesh of a segmented blob. As discussed herein, hand blob 801 may be provided via blob segmentation and tracking module 301 as a target for matching a kinematic model of an articulated body. Furthermore, initial pose 802 may include a pose of the kinematic model based on initial kinematic parameters. For example, initial pose 802 (e.g., the associated initial kinematic parameters) may be generated by (re)initialization module 310 based on a rigid motion approximation of a hand model of a previous frame, based on providing finger labels to hand blob 801 and generating associated initial kinematic parameters, or the like. Resultant pose 803 may be generated via model refinement module 313 using techniques discussed herein such as the refinement techniques discussed with respect to process 200, ICPIK techniques, and the like. As shown, resultant pose 803 may closely track with hand blob 801 and may provide an improvement in matching over initial pose 802.

Figure 9:
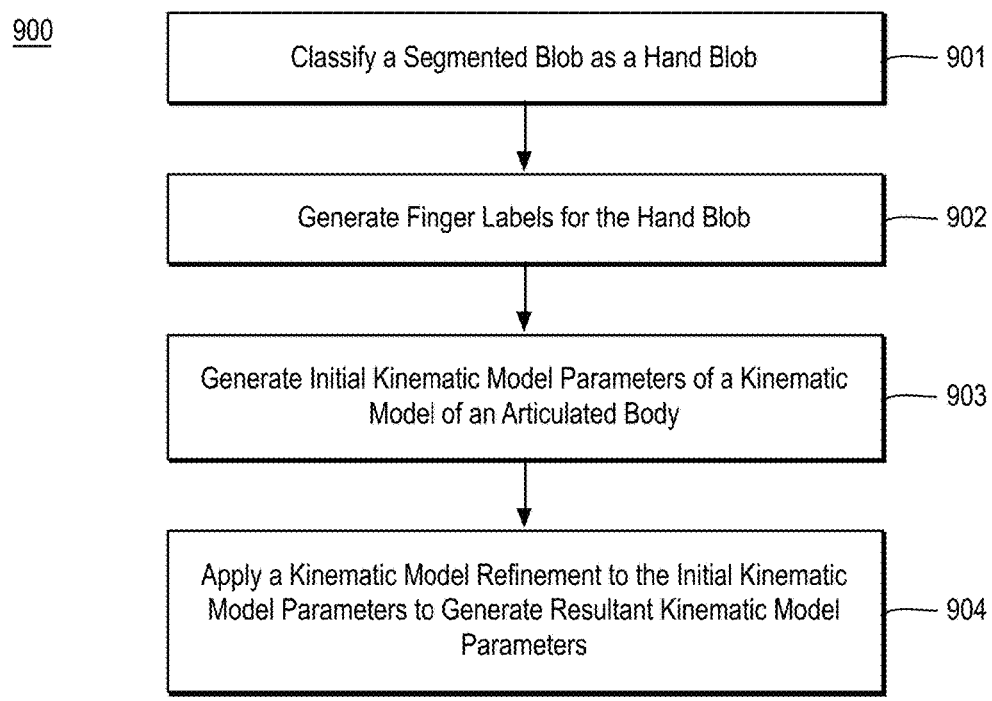
FIG. 9 is a flow diagram illustrating an example process for generating a pose estimation for an articulated body.

FIG. 9 is a flow diagram illustrating an example process 900 for generating a pose estimation for an articulated body, arranged in accordance with at least some implementations of the present disclosure. Process 900 may include one or more operations 901-904 as illustrated in FIG. 9. Process 900 may form at least part of a pose estimation process. By way of non-limiting example, process 900 may form at least part of a pose estimation process as performed by any device or system as discussed herein. In some examples, process 900 may be performed by system 300. Furthermore, process 900 will be described herein with reference to system 1000 of FIG. 10.

Figure 10:
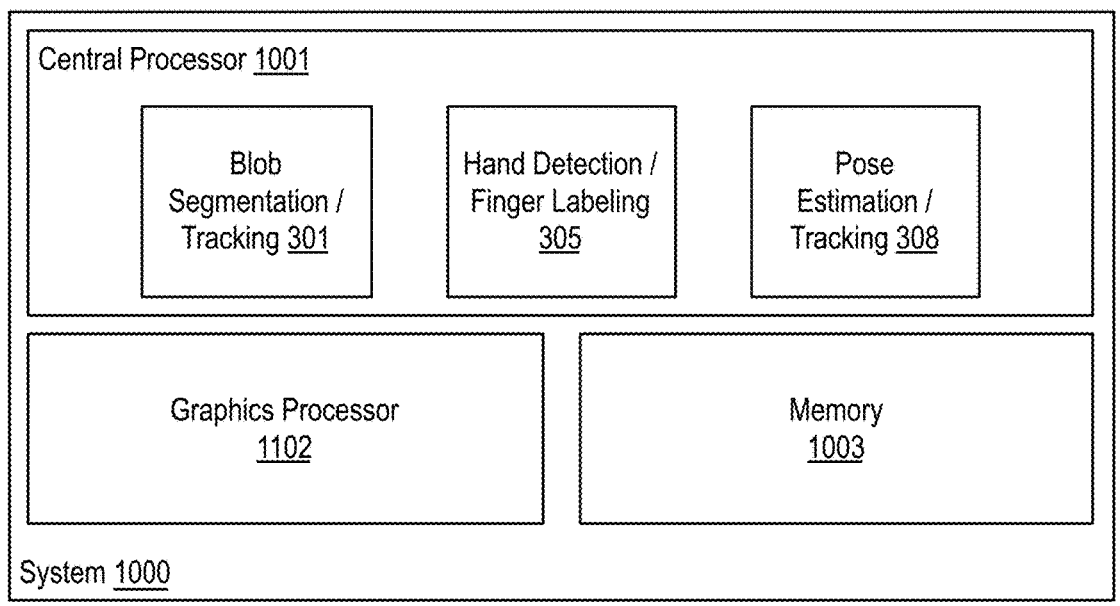
FIG. 10 is an illustrative diagram of an example system for generating a pose estimation for an articulated body.

FIG. 10 is an illustrative diagram of an example system 1000 for generating a pose estimation for an articulated body, arranged in accordance with at least some implementations of the present disclosure. As shown in FIG. 10, system 1000 may include a central processor 1001, a graphics processor 1002, and memory 1003. Also as shown, central processor 1001 may include or implement blob segmentation and tracking module 301, hand detection and finger labeling module 305, and pose estimation and tracking module 308. In the example of system 1000, memory 1003 may store image data or related content such as kinematic model parameters, target positions, end-effector positions, inverse kinematic problem parameters, blob data, classifier data, invariant feature data, finger labels, model selection parameters, convergence parameters, and/or any other data as discussed herein.

As shown, in some examples, blob segmentation and tracking module 301, hand detection and finger labeling module 305, and pose estimation and tracking module 308 may be implemented via central processor 1001. In other examples, one or more or portions of blob segmentation and tracking module 301, hand detection and finger labeling module 305, and pose estimation and tracking module 308 may be implemented via graphics processor 1002, or another processing unit.

Graphics processor 1002 may include any number and type of graphics processing units that may provide the operations as discussed herein. Such operations may be implemented via software or hardware or a combination thereof. For example, graphics processor 1002 may include circuitry dedicated to manipulate image data, kinematic model data, video data, or the like obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory.

In an embodiment, blob segmentation and tracking module 301, hand detection and finger labeling module 305, or pose estimation and tracking module 308 or portions thereof may be implemented via an execution unit (EU) of graphics processor 1002. The EU may include, for example, programmable logic or circuitry such as a logic core or cores that may provide a wide array of programmable logic functions. In an embodiment, blob segmentation and tracking module 301, hand detection and finger labeling module 305, or pose estimation and tracking module 308 or portions thereof may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, "Classify a Segmented Blob as a Hand Blob", where a segmented blob may be classified as a hand blob. For example, blob segmentation and tracking module 301 as implemented via central processor 1001 may classify a segmented blob as a hand blob. The segmented blob may be classified as a hand blob using any suitable technique or techniques. In some examples, the segmented blob may be classified as a hand blob by applying a random forest classifier to multiple invariant features associated with the segmented blob. For example, the invariant features may be any of those discussed herein and the invariant features may be combined to form one or more invariant feature vectors.

In some examples, prior to operation 901, the segmented blob may have been extracted from input image data such as input depth image data or the like. For example, blob segmentation and tracking module 301 as implemented via central processor 1001 may extract and segment a blob from input image data. The segmented blob may be extracted and segmented using any suitable techniques. In some examples, the segmented blob may be extracted and segmented based on an over-segmentation of the input depth image data to generate super-pixels and merging or splitting the super-pixels to generated the segmented blob.

Processing may continue at operation 902, "Generate Finger Labels for the Hand Blob", where finger labels may be generated for the hand blob. For example, hand detection and finger labeling module 305 as implemented via central processor 1001 may generate the finger labels for the hand blob. The finger labels may be generated using any suitable technique or techniques. In some examples, edge detection may be applied to the hand blob to determine potential finger portions of the hand blob, bases and tips of the portions of the hand blob may be located, and one or more invariant feature vectors associated with the portions of the hand blob may be generated. In some example, an invariant feature vector may be generated for each potential finger portion of the hand blob. In some example, a single invariant feature vector may be generated for the entire hand blob.

In some examples, the hand blob may be classified as a left hand or a right hand based on the one or more invariant feature vectors. Furthermore, in some examples, a classifier may provide finger labels for the left hand or right hand classified hand blob based on the one or more invariant feature vectors. In some examples, such finger labels may be based on a best guess or fit for each of the potential finger portions. Furthermore, in some examples, additional information such as statistics associated with other finger label permutations may be generated.

Processing may continue at operation 903, "Generate Initial Kinematic Model Parameters of a Kinematic Model of an Articulated Body", where, based on the labeled hand blob, initial kinematic model parameters may be generated that provide spatial relationships of elements of a kinematic model representing an articulated body. For example, pose estimation and tracking module 308 as implemented via central processor 1001 may generate the initial kinematic model parameters and other sets of initial kinematic model parameters as discussed herein.

In some examples, in addition to the initial kinematic model parameters, one or more additional sets of initial kinematic model parameters may be generated based on the labeled hand blob or the hand blob (e.g., without the labels). For example, such additional sets of initial kinematic model parameters may be generated based on multiple techniques for generating initial pose estimations based on the labeled hand blob data, based on finger label permutations generated for the labeled hand blob (e.g., guessing particular potential finger portions are different than the best guesses), or the like.

In some examples, the hand blob may be matched to a previous frame hand blob such that the hand blob is associated with a current frame and the previous frame hand blob is associated with a previous frame. Such a matching may provide a hand blob tracking across frames for example. In such examples, finger labels may be generated for the hand blob by copying finger labels from a previous hand model associated with the previous frame hand blob. Such finger labels may be generated in place of the finger labels generated at operation 902 or in addition to the finger labels generated at operation 902. When both techniques are used, such labels may provide different labels than those generated based on the hand blob (and therefore another starting point permutation for generating initial kinematic model parameters) or they may be the same (and therefore may be discarded as redundant).

Furthermore, in some examples, one or more additional sets of initial kinematic model parameters may be generated based on other data such as a hand model from a previous frame, a rigid body transformed hand model from previous frame or the like that is associated with the hand blob of the current frame. For example, a rigid transformation may be applied to a previous frame kinematic hand model from a previous frame such that the hand blob is associated with a current frame and the previous frame kinematic hand model is associated with a previous frame. In some examples, the previous frame kinematic hand model may include associated finger labels. Based on the transformed previous frame kinematic hand model, another set of initial kinematic model parameters may be generated.

In some examples, any of such sets of initial kinematic model parameters that are generated may be evaluated for a match to the hand blob and a subset of them may be provided for refinement. In other examples, all generated sets of initial kinematic model parameters that are generated may be provided for refinement.

Processing may continue at operation 904, "Apply a Kinematic Model Refinement to the Initial Kinematic Model Parameters to Generate Resultant Kinematic Model Parameters", where a kinematic model refinement to the initial kinematic model parameters may be applied based on matching the kinematic model to target positions of the hand blob to generate resultant kinematic model parameters. For example, pose estimation and tracking module 308 as implemented via central processor 1001 may apply the kinematic model refinement to the initial kinematic model parameters to generate resultant kinematic model parameters.

The kinematic model refinement may be applied via any suitable technique or techniques such as a particle swarm optimization technique, a Levenberg Marquardt technique based on a numerical Jacobian, a partial Levenberg Marquardt technique, or an inverse kinematics based iterative closest point technique.

In some examples, the kinematic model refinement may include selecting, based on the hand blob, target positions for matching the kinematic model, generating virtual end-effectors corresponding to the target positions based on the target positions and the kinematic model, generating an inverse kinematics problem including a Jacobian matrix based on the initial kinematic model parameters, the target positions, and the virtual end-effectors, determining a change in the kinematic model parameters based on the inverse kinematics problem, and repeating the selecting the plurality of target positions, generating the plurality of virtual end-effectors, generating the inverse kinematics problem, and determining the change in the kinematic model parameters until a convergence is attained to generate the resultant kinematic model parameters. In some examples such techniques may be characterized as inverse kinematics based iterative closest point techniques. As discussed the convergence may be based on an error of the kinematic model being less than a threshold, the error plateauing over a certain number of iterations (e.g., the change in error across iterations being less than a threshold), a maximum number of iterations being met, or the like.

As discussed, generating the inverse kinematics problem may include populating a Jacobian matrix. In some examples, the Jacobian matrix may be populated with pulling targets such that target points and end-effectors are drawn together during the solving of the inverse kinematics problem. In some examples, the Jacobian matrix may include an element having a target weighting parameter associated with a target position of the plurality of target positions (e.g., to provide a relative importance to the target position), an element having a joint weighting parameter associated with a joint of the kinematic model (e.g., to make a joint relatively easier or more difficult to move), or an element having a repulsive target functionality associated with a target position of the plurality of target positions (e.g., to push end-effectors away from the target position instead of pulling the end-effector toward the target position). In some examples, the inverse kinematics model may include a kinematic model parameter having a feasibility set such that the first kinematic model parameter must be within the feasibility set (e.g., to avoid impossible kinematic model positions or poses or the like).

As discussed, in some examples, a single set of initial kinematic model parameters may be refined to generate resultant kinematic model parameters. In other examples, multiple sets of initial kinematic model parameters may be refined to generate multiple sets of resultant kinematic model parameters. Furthermore, as discussed, the multiple sets of initial kinematic model parameters may be based on multiple permutations of finger labels applied to the same hand blob, rigid transformed previous frame hand models, or the like. In some examples, the multiple sets of resultant kinematic model parameters may be evaluated and a best match may be output. For example, resultant kinematic model parameters may be determined from the multiple sets of resultant kinematic model parameters based on a scoring. In some examples, the scoring may include determining an error based on comparing the kinematic model implementing a set of resultant kinematic model parameters to the hand blob (e.g., the target). In some examples, the resultant kinematic model parameters with the lowest error may be provided as output. Such kinematic model parameters may be provided for any suitable use or uses such as providing parameters for a forward kinematics problem that may be solved for a kinematic model to determine a pose of the kinematic model for display or storage for use by subsequent frames (e.g., for tracking or further pose estimation) or the like.

Process 900 may be repeated any number of times either in series or in parallel for any number hand blobs, or the like. Such hand blobs may be in the same image across multiple image frames, or the like. As discussed, process 900 may provide for pose estimation for an articulated body. Furthermore, process 900 may provide a blob detection, segmentation, and labeling process and/or a hand model pose estimation and tracking process.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
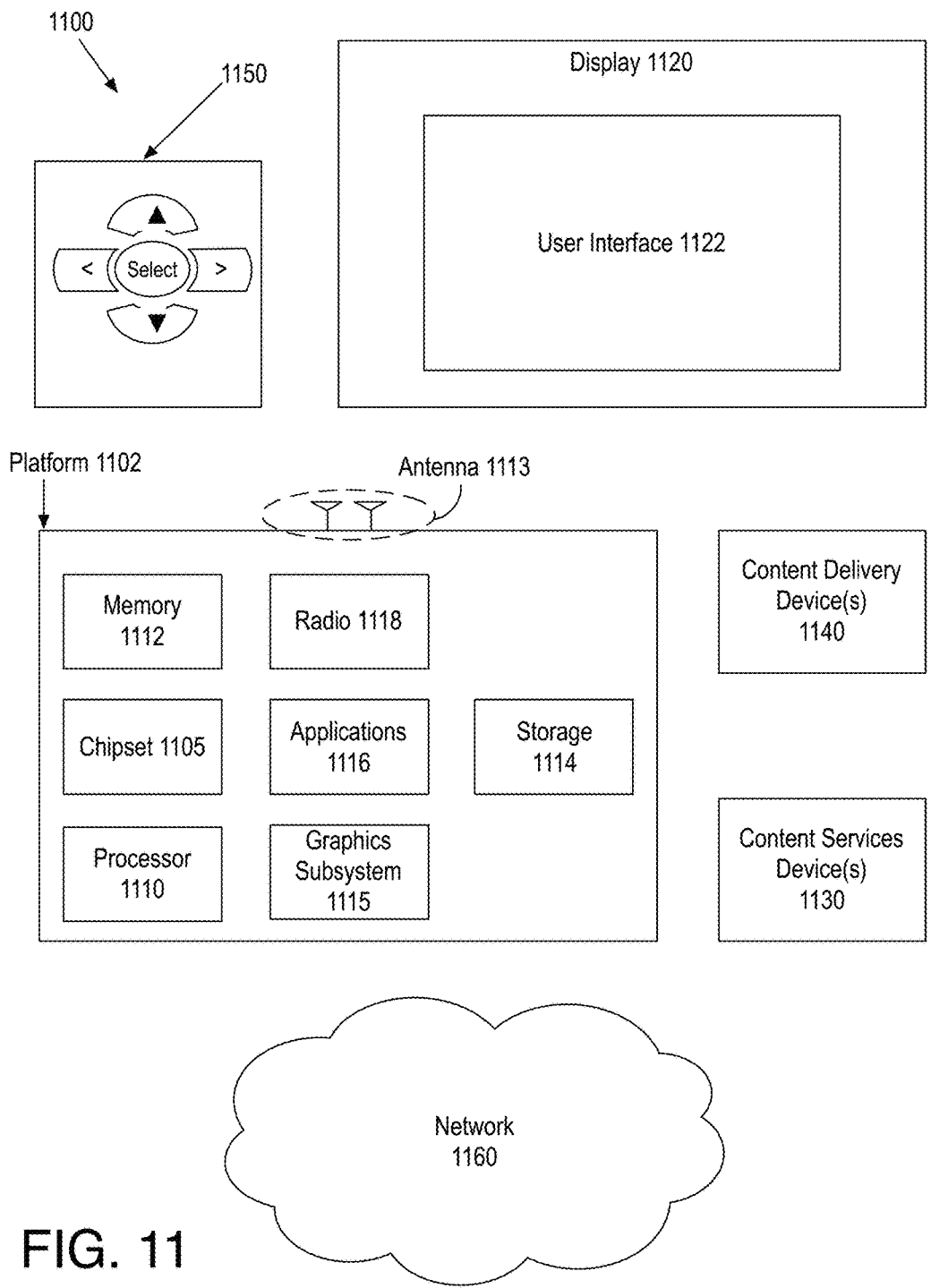
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. For example, system 1100 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1100 may be implemented via a cloud computing environment.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

In some examples, $J^T J$ and $J^T e$ as discussed herein may be generated via vector operations (e.g., single instruction multiple data) operations implemented via processor 1110 or a graphics processor of system 1100 or the like.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
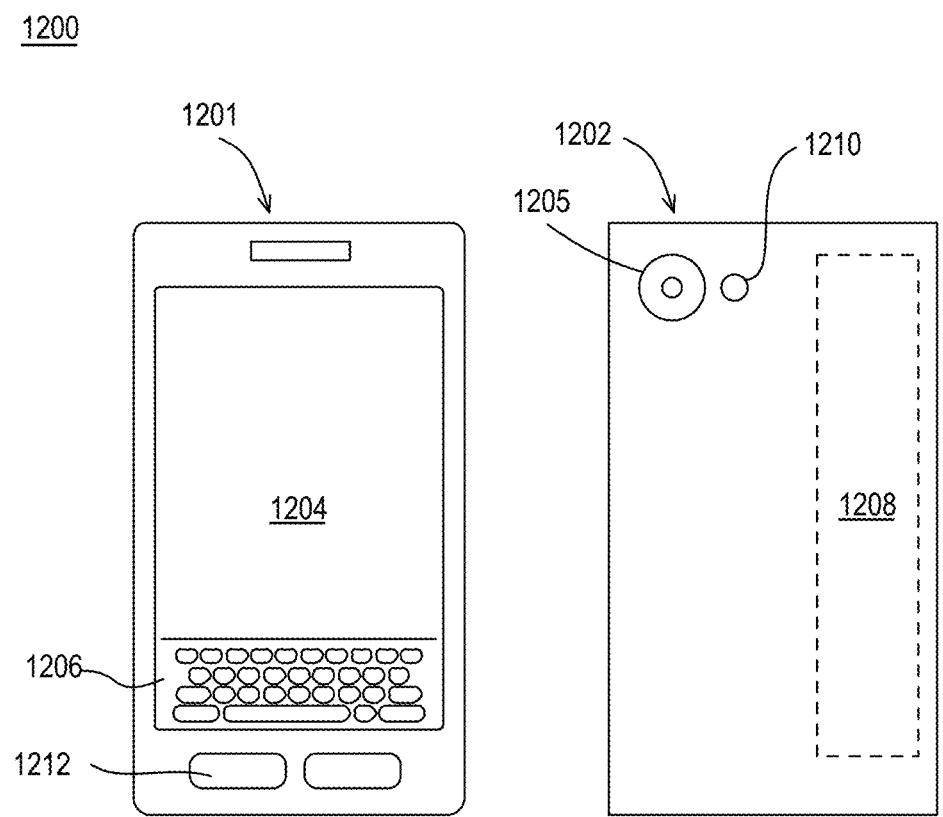
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. In other examples, camera 1205 and flash 1210 may be integrated into front 1201 of device 1200 or both front and back cameras may be provided. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a pose estimation for an articulated body comprises classifying a segmented blob as a hand blob, generating finger labels for the hand blob, generating, based on the labeled hand blob, initial kinematic model parameters that provide spatial relationships of elements of a kinematic model representing an articulated body, and applying a kinematic model refinement to the initial kinematic model parameters based on matching the kinematic model to target positions of the hand blob to generate resultant kinematic model parameters.

Further to the first embodiments, the method further comprises extracting the segmented blob from input depth image data, wherein extracting the segmented blob comprises an over-segmentation of the input depth image data to generate super-pixels and merging or splitting the super-pixels to generated the segmented blob.

Further to the first embodiments, classifying the segmented blob comprises applying a random forest classifier to a plurality of invariant features associated with the segmented blob.

Further to the first embodiments, the method further comprises matching the hand blob to a previous frame hand blob, wherein the hand blob is associated with a current frame and the previous frame hand blob is associated with a previous frame, and wherein generating the finger labels for the hand blob comprises copying finger labels from a previous hand model associated with the previous frame hand blob.

Further to the first embodiments, the method further comprises applying a rigid transformation to a second kinematic hand model, wherein the hand blob is associated with a current frame and the second kinematic hand model is associated with a previous frame, and wherein the second kinematic hand model comprises second finger labels, generating, based on the transformed second kinematic hand model, second initial kinematic model parameters, and applying a second kinematic model refinement to the second initial kinematic model parameters.

Further to the first embodiments, the method further comprises generating, based on the labeled hand blob, second initial kinematic model parameters, applying a second kinematic model refinement to the second initial kinematic model parameters to generate second resultant kinematic model parameters, and outputting at least one of the first or second resultant kinematic model parameters based on a scoring.

Further to the first embodiments, the method further comprises generating, based on the labeled hand blob, second initial kinematic model parameters, applying a second kinematic model refinement to the second initial kinematic model parameters to generate second resultant kinematic model parameters, and outputting at least one of the first or second resultant kinematic model parameters based on a scoring, wherein the scoring comprises a comparison of a first error and a second error, wherein the first error is based on comparing the kinematic model implementing the resultant kinematic model parameters with the hand blob and the second error is based on comparing the kinematic model implementing the second resultant kinematic model parameters with the hand blob.

Further to the first embodiments, generating the finger labels comprises applying edge detection to the hand blob, locating bases and tips of a plurality of portions of the hand blob, generating one or more invariant feature vectors associated with the portions of the hand blob, and classifying the hand blob as representing a left hand or a right hand based on the one or more invariant feature vectors.

Further to the first embodiments, generating the finger labels comprises applying edge detection to the hand blob, locating bases and tips of a plurality of portions of the hand blob, generating one or more invariant feature vectors associated with the portions of the hand blob, classifying the hand blob as representing a left hand or a right hand based on the one or more invariant feature vectors, the method further comprising providing one or more finger labels to each of the portions of the hand blob, and generating, based on the one or more finger labels, a plurality of sets of initial kinematic model parameters based on a plurality of finger label permutations associated with the hand blob.

Further to the first embodiments, generating the finger labels comprises applying edge detection to the hand blob, locating a base and a tip of a first portion of the hand blob, generating an invariant feature vector associated with the first portion of the hand blob, and providing a finger label to the first portion of the hand blob based on applying a classifier to the invariant feature vector.

Further to the first embodiments, the kinematic model refinement comprises at least one of a particle swarm optimization technique, a Levenberg Marquardt technique based on a numerical Jacobian, a partial Levenberg Marquardt technique, or an inverse kinematics based iterative closest point technique.

Further to the first embodiments, applying the kinematic model refinement comprises selecting, based on the hand blob, the target positions for matching the kinematic model, generating a plurality of virtual end-effectors corresponding to the target positions based on the plurality of target positions and the kinematic model, generating an inverse kinematics problem comprising a Jacobian matrix based on the initial kinematic model parameters, the target positions, and the virtual end-effectors, determining a change in the kinematic model parameters based on the inverse kinematics problem, and repeating the selecting the plurality of target positions, generating the plurality of virtual end-effectors, generating the inverse kinematics problem, and determining the change in the kinematic model parameters until a convergence is attained to generate the resultant kinematic model parameters.

Further to the first embodiments, applying the kinematic model refinement comprises selecting, based on the hand blob, the target positions for matching the kinematic model, generating a plurality of virtual end-effectors corresponding to the target positions based on the plurality of target positions and the kinematic model, generating an inverse kinematics problem comprising a Jacobian matrix based on the initial kinematic model parameters, the target positions, and the virtual end-effectors, determining a change in the kinematic model parameters based on the inverse kinematics problem, and repeating the selecting the plurality of target positions, generating the plurality of virtual end-effectors, generating the inverse kinematics problem, and determining the change in the kinematic model parameters until a convergence is attained to generate the resultant kinematic model parameters, wherein the Jacobian matrix comprises at least one of an element having a target weighting parameter associated with a first target position of the plurality of target positions, an element having a joint weighting parameter associated with a first joint of the elements of the kinematic model, or an element having a repulsive target functionality associated with a first target position of the plurality of target positions.

Further to the first embodiments, applying the kinematic model refinement comprises selecting, based on the hand blob, the target positions for matching the kinematic model, generating a plurality of virtual end-effectors corresponding to the target positions based on the plurality of target positions and the kinematic model, generating an inverse kinematics problem comprising a Jacobian matrix based on the initial kinematic model parameters, the target positions, and the virtual end-effectors, determining a change in the kinematic model parameters based on the inverse kinematics problem, and repeating the selecting the plurality of target positions, generating the plurality of virtual end-effectors, generating the inverse kinematics problem, and determining the change in the kinematic model parameters until a convergence is attained to generate the resultant kinematic model parameters, wherein the inverse kinematics model comprises at least one first kinematic model parameter comprising a feasibility set such that the first kinematic model parameter must be within the feasibility set.

In one or more second embodiments, a system for generating a pose estimation for an articulated body comprises a memory to store image data and a central processor coupled to the memory, the central processor to classify a segmented blob as a hand blob, generate finger labels for the hand blob, generate, based on the labeled hand blob, initial kinematic model parameters that provide spatial relationships of elements of a kinematic model representing an articulated body, and apply a kinematic model refinement to the initial kinematic model parameters based on matching the kinematic model to target positions of the hand blob to generate resultant kinematic model parameters.

Further to the second embodiments, the central processor is further to extract the segmented blob from input depth image data, wherein the central processor to extract the segmented blob comprises the central processor to provide an over-segmentation of the input depth image data to generate super-pixels and merge or split the super-pixels to generate the segmented blob.

Further to the second embodiments, the central processor to classify the segmented blob comprises the central processor to apply a random forest classifier to a plurality of invariant features associated with the segmented blob.

Further to the second embodiments, the central processor is further to match the hand blob to a previous frame hand blob, wherein the hand blob is associated with a current frame and the previous frame hand blob is associated with a previous frame, and wherein the central processor to generate the finger labels for the hand blob comprises the central processor to copy finger labels from a previous hand model associated with the previous frame hand blob.

Further to the second embodiments, the central processor is further to apply a rigid transformation to a second kinematic hand model, wherein the hand blob is associated with a current frame and the second kinematic hand model is associated with a previous frame, and wherein the second kinematic hand model comprises second finger labels, generate, based on the transformed second kinematic hand model, second initial kinematic model parameters, and apply a second kinematic model refinement to the second initial kinematic model parameters.

Further to the second embodiments, the central processor is further to generate, based on the labeled hand blob, second initial kinematic model parameters, apply a second kinematic model refinement to the second initial kinematic model parameters to generate second resultant kinematic model parameters, and output at least one of the first or second resultant kinematic model parameters based on a scoring.

Further to the second embodiments, the central processor is further to generate, based on the labeled hand blob, second initial kinematic model parameters, apply a second kinematic model refinement to the second initial kinematic model parameters to generate second resultant kinematic model parameters, and output at least one of the first or second resultant kinematic model parameters based on a scoring, wherein the scoring comprises a comparison of a first error and a second error, wherein the first error is based on a comparison of the kinematic model implementing the resultant kinematic model parameters with the hand blob and the second error is based on a comparison of the kinematic model implementing the second resultant kinematic model parameters with the hand blob.

Further to the second embodiments, the central processor to generate the finger labels comprises the central processor to apply edge detection to the hand blob, locate bases and tips of a plurality of portions of the hand blob, generate one or more invariant feature vectors associated with the portions of the hand blob, and classify the hand blob as representing a left hand or a right hand based on the one or more invariant feature vectors.

Further to the second embodiments, the central processor to generate the finger labels comprises the central processor to apply edge detection to the hand blob, locate bases and tips of a plurality of portions of the hand blob, generate one or more invariant feature vectors associated with the portions of the hand blob, and classify the hand blob as representing a left hand or a right hand based on the one or more invariant feature vectors, wherein the central processor is further to provide one or more finger labels to each of the portions of the hand blob and generate, based on the one or more finger labels, a plurality of sets of initial kinematic model parameters based on a plurality of finger label permutations associated with the hand blob.

Further to the second embodiments, the central processor to generate the finger labels comprises the central processor to apply edge detection to the hand blob, locate a base and a tip of a first portion of the hand blob, generate an invariant feature vector associated with the first portion of the hand blob, and provide a finger label to the first portion of the hand blob based on application of a classifier to the invariant feature vector.

Further to the second embodiments, the kinematic model refinement comprises at least one of a particle swarm optimization technique, a Levenberg Marquardt technique based on a numerical Jacobian, a partial Levenberg Marquardt technique, or an inverse kinematics based iterative closest point technique.

Further to the second embodiments, the central processor to apply the kinematic model refinement comprises the central processor to select, based on the hand blob, the target positions for matching the kinematic model, generate a plurality of virtual end-effectors corresponding to the target positions based on the plurality of target positions and the kinematic model, generate an inverse kinematics problem comprising a Jacobian matrix based on the initial kinematic model parameters, the target positions, and the virtual end-effectors, determine a change in the kinematic model parameters based on the inverse kinematics problem, and repeat the selection of the plurality of target positions, generation of the plurality of virtual end-effectors, generation of the inverse kinematics problem, and determination of the change in the kinematic model parameters until a convergence is attained to generate the resultant kinematic model parameters.

Further to the second embodiments, the central processor to apply the kinematic model refinement comprises the central processor to select, based on the hand blob, the target positions for matching the kinematic model, generate a plurality of virtual end-effectors corresponding to the target positions based on the plurality of target positions and the kinematic model, generate an inverse kinematics problem comprising a Jacobian matrix based on the initial kinematic model parameters, the target positions, and the virtual end-effectors, determine a change in the kinematic model parameters based on the inverse kinematics problem, and repeat the selection of the plurality of target positions, generation of the plurality of virtual end-effectors, generation of the inverse kinematics problem, and determination of the change in the kinematic model parameters until a convergence is attained to generate the resultant kinematic model parameters, wherein the Jacobian matrix comprises at least one of an element having a target weighting parameter associated with a first target position of the plurality of target positions, an element having a joint weighting parameter associated with a first joint of the elements of the kinematic model, or an element having a repulsive target functionality associated with a first target position of the plurality of target positions.

Further to the second embodiments, the central processor to apply the kinematic model refinement comprises the central processor to select, based on the hand blob, the target positions for matching the kinematic model, generate a plurality of virtual end-effectors corresponding to the target positions based on the plurality of target positions and the kinematic model, generate an inverse kinematics problem comprising a Jacobian matrix based on the initial kinematic model parameters, the target positions, and the virtual end-effectors, determine a change in the kinematic model parameters based on the inverse kinematics problem, and repeat the selection of the plurality of target positions, generation of the plurality of virtual end-effectors, generation of the inverse kinematics problem, and determination of the change in the kinematic model parameters until a convergence is attained to generate the resultant kinematic model parameters, wherein the inverse kinematics model comprises at least one first kinematic model parameter comprising a feasibility set such that the first kinematic model parameter must be within the feasibility set.

In one or more third embodiments, a system for generating a pose estimation for an articulated body comprises means for classifying a segmented blob as a hand blob, means for generating finger labels for the hand blob, means for generating, based on the labeled hand blob, initial kinematic model parameters that provide spatial relationships of elements of a kinematic model representing an articulated body, and means for applying a kinematic model refinement to the initial kinematic model parameters based on matching the kinematic model to target positions of the hand blob to generate resultant kinematic model parameters.

Further to the third embodiments, the system further comprises means for extracting the segmented blob from input depth image data, wherein the means for extracting the segmented blob comprises an over-segmentation of the input depth image data to generate super-pixels and merging or splitting the super-pixels to generated the segmented blob.

Further to the third embodiments, the means for classifying the segmented blob comprise means for applying a random forest classifier to a plurality of invariant features associated with the segmented blob.

Further to the third embodiments, the system further comprises means for matching the hand blob to a previous frame hand blob, wherein the hand blob is associated with a current frame and the previous frame hand blob is associated with a previous frame, and wherein the means for generating the finger labels for the hand blob comprise means for copying finger labels from a previous hand model associated with the previous frame hand blob.

Further to the third embodiments, the system further comprises means for applying a rigid transformation to a second kinematic hand model, wherein the hand blob is associated with a current frame and the second kinematic hand model is associated with a previous frame, and wherein the second kinematic hand model comprises second finger labels, means for generating, based on the transformed second kinematic hand model, second initial kinematic model parameters, and means for applying a second kinematic model refinement to the second initial kinematic model parameters.

Further to the third embodiments, the system further comprises means for generating, based on the labeled hand blob, second initial kinematic model parameters, means for applying a second kinematic model refinement to the second initial kinematic model parameters to generate second resultant kinematic model parameters, and means for outputting at least one of the first or second resultant kinematic model parameters based on a scoring.

Further to the third embodiments, the system further comprises means for generating, based on the labeled hand blob, second initial kinematic model parameters, means for applying a second kinematic model refinement to the second initial kinematic model parameters to generate second resultant kinematic model parameters, and means for outputting at least one of the first or second resultant kinematic model parameters based on a scoring, wherein the scoring comprises a comparison of a first error and a second error, wherein the first error is based on comparing the kinematic model implementing the resultant kinematic model parameters with the hand blob and the second error is based on comparing the kinematic model implementing the second resultant kinematic model parameters with the hand blob.

Further to the third embodiments, the means for generating the finger labels comprise means for applying edge detection to the hand blob, means for locating bases and tips of a plurality of portions of the hand blob, means for generating one or more invariant feature vectors associated with the portions of the hand blob, and means for classifying the hand blob as representing a left hand or a right hand based on the one or more invariant feature vectors.

Further to the third embodiments, the means for generating the finger labels comprise means for applying edge detection to the hand blob, means for locating bases and tips of a plurality of portions of the hand blob, means for generating one or more invariant feature vectors associated with the portions of the hand blob, and means for classifying the hand blob as representing a left hand or a right hand based on the one or more invariant feature vectors, and the system further comprises means for providing one or more finger labels to each of the portions of the hand blob and means for generating, based on the one or more finger labels, a plurality of sets of initial kinematic model parameters based on a plurality of finger label permutations associated with the hand blob.

Further to the third embodiments, the means for generating the finger labels comprise means for applying edge detection to the hand blob, means for locating a base and a tip of a first portion of the hand blob, means for generating an invariant feature vector associated with the first portion of the hand blob, and means for providing a finger label to the first portion of the hand blob based on applying a classifier to the invariant feature vector.

Further to the third embodiments, the kinematic model refinement comprises at least one of a particle swarm optimization technique, a Levenberg Marquardt technique based on a numerical Jacobian, a partial Levenberg Marquardt technique, or an inverse kinematics based iterative closest point technique.

Further to the third embodiments, the means for applying the kinematic model refinement comprise means for selecting, based on the hand blob, the target positions for matching the kinematic model, means for generating a plurality of virtual end-effectors corresponding to the target positions based on the plurality of target positions and the kinematic model, means for generating an inverse kinematics problem comprising a Jacobian matrix based on the initial kinematic model parameters, the target positions, and the virtual end-effectors, means for determining a change in the kinematic model parameters based on the inverse kinematics problem, and means for repeating the selecting the plurality of target positions, generating the plurality of virtual end-effectors, generating the inverse kinematics problem, and determining the change in the kinematic model parameters until a convergence is attained to generate the resultant kinematic model parameters.

Further to the third embodiments, the means for applying the kinematic model refinement comprise means for selecting, based on the hand blob, the target positions for matching the kinematic model, means for generating a plurality of virtual end-effectors corresponding to the target positions based on the plurality of target positions and the kinematic model, means for generating an inverse kinematics problem comprising a Jacobian matrix based on the initial kinematic model parameters, the target positions, and the virtual end-effectors, means for determining a change in the kinematic model parameters based on the inverse kinematics problem, and means for repeating the selecting the plurality of target positions, generating the plurality of virtual end-effectors, generating the inverse kinematics problem, and determining the change in the kinematic model parameters until a convergence is attained to generate the resultant kinematic model parameters, wherein the Jacobian matrix comprises at least one of an element having a target weighting parameter associated with a first target position of the plurality of target positions, an element having a joint weighting parameter associated with a first joint of the elements of the kinematic model, or an element having a repulsive target functionality associated with a first target position of the plurality of target positions.

Further to the third embodiments, the means for applying the kinematic model refinement comprise means for selecting, based on the hand blob, the target positions for matching the kinematic model, means for generating a plurality of virtual end-effectors corresponding to the target positions based on the plurality of target positions and the kinematic model, means for generating an inverse kinematics problem comprising a Jacobian matrix based on the initial kinematic model parameters, the target positions, and the virtual end-effectors, means for determining a change in the kinematic model parameters based on the inverse kinematics problem, and means for repeating the selecting the plurality of target positions, generating the plurality of virtual end-effectors, generating the inverse kinematics problem, and determining the change in the kinematic model parameters until a convergence is attained to generate the resultant kinematic model parameters, wherein the inverse kinematics model comprises at least one first kinematic model parameter comprising a feasibility set such that the first kinematic model parameter must be within the feasibility set.

In one or more fourth embodiments, at least one machine readable medium comprises a plurality of instructions that, in response to being executed on a computing device, cause the computing device to generate a pose estimation for an articulated body by classifying a segmented blob as a hand blob, generating finger labels for the hand blob, generating, based on the labeled hand blob, initial kinematic model parameters that provide spatial relationships of elements of a kinematic model representing an articulated body, and applying a kinematic model refinement to the initial kinematic model parameters based on matching the kinematic model to target positions of the hand blob to generate resultant kinematic model parameters.

Further to the fourth embodiments, the machine readable medium comprises further instructions that, in response to being executed on the computing device, cause the computing device to generate the pose estimation for the articulated body by applying a rigid transformation to a second kinematic hand model, wherein the hand blob is associated with a current frame and the second kinematic hand model is associated with a previous frame, and wherein the second kinematic hand model comprises second finger labels, generating, based on the transformed second kinematic hand model, second initial kinematic model parameters, and applying a second kinematic model refinement to the second initial kinematic model parameters.

Further to the fourth embodiments, the machine readable medium comprises further instructions that, in response to being executed on the computing device, cause the computing device to generate the pose estimation for the articulated body by generating, based on the labeled hand blob, second initial kinematic model parameters, applying a second kinematic model refinement to the second initial kinematic model parameters to generate second resultant kinematic model parameters, and outputting at least one of the first or second resultant kinematic model parameters based on a scoring.

Further to the fourth embodiments, the kinematic model refinement comprises at least one of a particle swarm optimization technique, a Levenberg Marquardt technique based on a numerical Jacobian, a partial Levenberg Marquardt technique, or an inverse kinematics based iterative closest point technique.

Further to the fourth embodiments, the machine readable medium comprises further instructions that, in response to being executed on the computing device, cause the computing device to generate the pose estimation for the articulated body by selecting, based on the hand blob, the target positions for matching the kinematic model, generating a plurality of virtual end-effectors corresponding to the target positions based on the plurality of target positions and the kinematic model, generating an inverse kinematics problem comprising a Jacobian matrix based on the initial kinematic model parameters, the target positions, and the virtual end-effectors, determining a change in the kinematic model parameters based on the inverse kinematics problem, and repeating the selecting the plurality of target positions, generating the plurality of virtual end-effectors, generating the inverse kinematics problem, and determining the change in the kinematic model parameters until a convergence is attained to generate the resultant kinematic model parameters.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for generating a pose estimation for an articulated body comprising:
    classifying a segmented blob as a hand blob;
    generating one or more sets of finger labels for the hand blob;
    generating, based at least in part on the labeled hand blob, a plurality of sets of initial kinematic model parameters that each provides spatial relationships of elements of a kinematic model representing an articulated body;
    evaluating each of the plurality of sets of initial kinematic model parameters to determine a predetermined number of selected sets of initial kinematic model parameters, wherein the predetermined number of selected sets is less than the number evaluated sets of initial kinematic model parameters;
    applying a kinematic model refinement to each of the selected sets of initial kinematic model parameters based on matching the kinematic model to target positions of the hand blob to generate multiple sets of resultant kinematic model parameters;
    selecting a final resultant set of the multiple sets of resultant kinematic model parameters based on a scoring of the multiple sets of resultant kinematic model parameters; and outputting the selected resultant set of kinematic model parameters.

2. The method of claim 1, further comprising:
extracting the segmented blob from input depth image data, wherein extracting the segmented blob comprises:
an over-segmentation of the input depth image data to generate super-pixels,
wherein the super-pixels comprise regions of the input depth image data having depth gradients less than a predefined threshold; and
merging or splitting the super-pixels to generate the segmented blob.

3. The method of claim 1, wherein classifying the segmented blob comprises applying a random forest classifier to a plurality of invariant features associated with the segmented blob.

4. The method of claim 1, further comprising:
matching the hand blob to a previous frame hand blob, wherein the hand blob is associated with a current frame and the previous frame hand blob is associated with a previous frame, and wherein generating the one or more sets of finger labels for the hand blob comprises copying finger labels from a previous hand model associated with the previous frame hand blob.

5. The method of claim 1, further comprising:
applying a rigid transformation to a second kinematic hand model, wherein the hand blob is associated with a current frame and the second kinematic hand model is associated with a previous frame, and wherein the second kinematic hand model comprises second finger labels; and
generating, based on the transformed second kinematic hand model, a second set of initial kinematic model parameters, wherein the plurality of sets of initial kinematic model parameters for evaluation comprises the second set of initial kinematic model parameters.

6. The method of claim 1, wherein a first set of initial kinematic model parameters corresponds to a first set of the one or more sets of finger labels and a second set of initial kinematic model parameters corresponds to a second set of the one or more sets of finger labels, wherein the first set of finger labels provides a first finger label to a first portion of the hand blob and the second set of finger labels provides a second finger label different than the first finger label to the first portion of the hand blob.

7. The method of claim 1, wherein the scoring comprises a comparison of multiple errors, each associated with one of the multiple sets of resultant kinematic model parameters, wherein each of the multiple errors is based on comparing the kinematic model implementing a corresponding one of the multiple sets of resultant kinematic model parameters with the hand blob.

8. The method of claim 1, wherein generating at least one of the one or more sets the finger labels comprises:
applying edge detection to the hand blob;
locating bases and tips of a plurality of portions of the hand blob;
generating invariant feature vectors associated with the portions of the hand blob; and
classifying the hand blob as representing a left hand or a right hand based on the one or more invariant feature vectors.

9. The method of claim 8, further comprising:
providing one or more finger labels to each of the portions of the hand blob; and
generating, based on the one or more finger labels, at least some of the plurality of sets of initial kinematic model parameters based on a plurality of finger label permutations associated with the hand blob.

10. The method of claim 1, wherein generating the finger labels comprises:
applying edge detection to the hand blob;
locating a base and a tip of a first portion of the hand blob;
generating an invariant feature vector associated with the first portion of the hand blob, the invariant feature vector comprising a width of the first portion, a length of the first portion and, for each of a plurality of cells of an image grid centered at the base of the first portion, a major edge orientation and a depth difference between an average depth of the cell and a reference depth; and
providing a finger label to the first portion of the hand blob based on applying a classifier to the invariant feature vector.

11. The method of claim 1, wherein the kinematic model refinement comprises at least one of a particle swarm optimization technique, a Levenberg Marquardt technique based on a numerical Jacobian, a partial Levenberg Marquardt technique, or an inverse kinematics based iterative closest point technique.

12. The method of claim 1, wherein the kinematic model comprises a pose based on initial kinematic model parameters that provide spatial relationships of elements of the kinematic model, and wherein the kinematic model comprises a plurality of joints, a plurality of end-effectors, and links between selected joints and end-effectors all within a model skin of the kinematic model, and wherein applying the kinematic model refinement to a first set of initial kinetic model parameters comprises:
selecting, based on the hand blob, target positions for matching the kinematic model;
generating, in addition to the end-effectors of the kinematic model, a plurality of virtual end-effectors corresponding to the target positions based on the plurality of target positions and the kinematic model, wherein each of the virtual end-effectors is generated at a point on the model skin of the kinematic model closest to an associated target position of the target positions;
generating an inverse kinematics problem comprising a Jacobian matrix based on the first set of initial kinematic model parameters, the target positions, and the virtual end-effectors;
determining a change in the first set of kinematic model parameters based on the inverse kinematics problem; and
repeating the selecting the plurality of target positions, generating the plurality of virtual end-effectors, generating the inverse kinematics problem, and determining the change in the first set of kinematic model parameters until a convergence is attained to generate a first set of resultant kinematic model parameters.

13. The method of claim 12, wherein the Jacobian matrix comprises at least one of an element having a target weighting parameter associated with a first target position of the plurality of target positions, an element having a joint weighting parameter associated with a first joint of the elements of the kinematic model, or an element having a repulsive target functionality associated with a first target position of the plurality of target positions.

14. The method of claim 12, wherein the inverse kinematics model comprises at least one first kinematic model parameter comprising a feasibility set such that the first kinematic model parameter must be within the feasibility set.

15. A system for generating a pose estimation for an articulated body comprising:
a memory to store image data; and
a central processor coupled to the memory, the central processor to classify a segmented blob as a hand blob, to generate one or more sets of finger labels for the hand blob, to generate, at least in part on the labeled hand blob, a plurality of sets of initial kinematic model parameters that each provides spatial relationships of elements of a kinematic model representing an articulated body, to evaluate each of the plurality of sets of initial kinematic model parameters to determine a predetermined number of selected sets of initial kinematic model parameters, wherein the predetermined number of selected sets is less than the number evaluated sets of initial kinematic model parameters, to apply a kinematic model refinement to each of the selected sets of initial kinematic model parameters based on matching the kinematic model to target positions of the hand blob to multiple sets of generate resultant kinematic model parameters, to select a final resultant set of the multiple sets of resultant kinematic model parameters based on a scoring of the multiple sets of resultant kinematic model parameters, and to output the selected resultant set of kinematic model parameters.

16. The system of claim 15, wherein the central processor is further to apply a rigid transformation to a second kinematic hand model, wherein the hand blob is associated with a current frame and the second kinematic hand model is associated with a previous frame, and wherein the second kinematic hand model comprises second finger labels, and to generate, based on the transformed second kinematic hand model, a second set of initial kinematic model parameters, wherein the plurality of sets of initial kinematic model parameters for evaluation comprises the second set of initial kinematic model parameters.

17. The system of claim 15, wherein a first set of initial kinematic model parameters corresponds to a first set of the one or more sets of finger labels and a second set of initial kinematic model parameters corresponds to a second set of the one or more sets of finger labels, wherein the first set of finger labels provides a first finger label to a first portion of the hand blob and the second set of finger labels provides a second finger label different than the first finger label to the first portion of the hand blob.

18. The system of claim 15, wherein the kinematic model refinement comprises at least one of a particle swarm optimization technique, a Levenberg Marquardt technique based on a numerical Jacobian, a partial Levenberg Marquardt technique, or an inverse kinematics based iterative closest point technique.

19. The system of claim 15, wherein the kinematic model comprises a pose based on initial kinematic model parameters that provide spatial relationships of elements of the kinematic model, and wherein the kinematic model comprises a plurality of joints, a plurality of end-effectors, and links between selected joints and end-effectors all within a model skin of the kinematic model, and wherein the central processor to apply the kinematic model refinement to a first set of initial kinetic model parameters comprises the central processor to select, based on the hand blob, target positions for matching the kinematic model, to generate, in addition to the end-effectors of the kinematic model, a plurality of virtual end-effectors corresponding to the target positions based on the plurality of target positions and the kinematic model, wherein each of the virtual end-effectors is generated at a point on the model skin of the kinematic model closest to an associated target position of the target positions, to generate an inverse kinematics problem comprising a Jacobian matrix based on the first set of initial kinematic model parameters, the target positions, and the virtual end-effectors, to determine a change in the first set of kinematic model parameters based on the inverse kinematics problem, and to repeat the selection of the plurality of target positions, generation of the plurality of virtual end-effectors, generation of the inverse kinematics problem, and determination of the change in the first set of kinematic model parameters until a convergence is attained to generate a first set of resultant kinematic model parameters.

20. The system of claim 19, wherein the Jacobian matrix comprises at least one of an element having a target weighting parameter associated with a first target position of the plurality of target positions, an element having a joint weighting parameter associated with a first joint of the elements of the kinematic model, or an element having a repulsive target functionality associated with a first target position of the plurality of target positions.

21. At least one non-transitory machine readable medium comprising a plurality of instructions that, in response to being executed on a computing device, cause the computing device to generate a pose estimation for an articulated body by:
classifying a segmented blob as a hand blob;
generating one or more sets of finger labels for the hand blob;
generating, based at least in part on the labeled hand blob, a plurality of sets of initial kinematic model parameters that each provides spatial relationships of elements of a kinematic model representing an articulated body;
evaluating each of the plurality of sets of initial kinematic model parameters to determine a predetermined number of selected sets of initial kinematic model parameters, wherein the predetermined number of selected sets is less than the number evaluated sets of initial kinematic model parameters;
applying a kinematic model refinement to each of the selected sets of initial kinematic model parameters based on matching the kinematic model to target positions of the hand blob to generate multiple sets of resultant kinematic model parameters;
selecting a final resultant set of the multiple sets of resultant kinematic model parameters based on a scoring of the multiple sets of resultant kinematic model parameters; and
outputting the selected resultant set of kinematic model parameters.

22. The machine readable medium of claim 21 comprising further instructions that, in response to being executed on the computing device, cause the computing device to generate the pose estimation for the articulated body by:
applying a rigid transformation to a second kinematic hand model, wherein the hand blob is associated with a current frame and the second kinematic hand model is associated with a previous frame, and wherein the second kinematic hand model comprises second finger labels; and
generating, based on the transformed second kinematic hand model, a second set of initial kinematic model parameters, wherein the plurality of sets of initial kinematic model parameters for evaluation comprises the second set of initial kinematic model parameters.

23. The machine readable medium of claim 21, wherein a first set of initial kinematic model parameters corresponds to a first set of the one or more sets of finger labels and a second set of initial kinematic model parameters corresponds to a second set of the one or more sets of finger labels, wherein the first set of finger labels provides a first finger label to a first portion of the hand blob and the second set of finger labels provides a second finger label different than the first finger label to the first portion of the hand blob.

24. The machine readable medium of claim 21, wherein the kinematic model refinement comprises at least one of a particle swarm optimization technique, a Levenberg Marquardt technique based on a numerical Jacobian, a partial Levenberg Marquardt technique, or an inverse kinematics based iterative closest point technique.

25. The machine readable medium of claim 21, wherein the kinematic model comprises a pose based on initial kinematic model parameters that provide spatial relationships of elements of the kinematic model, and wherein the kinematic model comprises a plurality of joints, a plurality of end-effectors, and links between selected joints and end-effectors all within a model skin of the kinematic model, and wherein applying the kinematic model refinement to a first set of initial kinetic model parameters comprises:

selecting, based on the hand blob, target positions for matching the kinematic model;

generating, in addition to the end-effectors of the kinematic model, a plurality of virtual end-effectors corresponding to the target positions based on the plurality of target positions and the kinematic model, wherein each of the virtual end-effectors is generated at a point on the model skin of the kinematic model closest to an associated target position of the target positions;

generating an inverse kinematics problem comprising a Jacobian matrix based on the first set of initial kinematic model parameters, the target positions, and the virtual end-effectors;

determining a change in the first set of kinematic model parameters based on the inverse kinematics problem; and repeating the selecting the plurality of target positions, generating the plurality of virtual end-effectors, generating the inverse kinematics problem, and determining the change in the first set of kinematic model parameters until a convergence is attained to generate a first set of resultant kinematic model parameters.

\* \* \* \* \*